(12) United States Patent
Nishiyama

(10) Patent No.: US 8,552,609 B2
(45) Date of Patent: Oct. 8, 2013

(54) SYNCHRONOUS MOTOR AND SYSTEM FOR DRIVING SYNCHRONOUS MOTOR

(75) Inventor: Noriyoshi Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 13/145,180

(22) PCT Filed: Aug. 5, 2010

(86) PCT No.: PCT/JP2010/004920
§ 371 (c)(1),
(2), (4) Date: Jul. 19, 2011

(87) PCT Pub. No.: WO2011/016235
PCT Pub. Date: Feb. 10, 2011

(65) Prior Publication Data
US 2011/0273128 A1    Nov. 10, 2011

(30) Foreign Application Priority Data

Aug. 6, 2009    (JP) ................................. 2009-183448

(51) Int. Cl.
*H02K 3/00*    (2006.01)

(52) U.S. Cl.
USPC ........... 310/179; 310/180; 310/184; 310/189; 310/195

(58) Field of Classification Search
CPC ........ H02K 21/00; H02K 23/02; H02K 19/26
USPC ................ 310/179, 180, 184, 189, 195, 208
See application file for complete search history.

(56) References Cited

U.S. PATENT DOCUMENTS

| | | | |
|---|---|---|---|
| 3,588,888 A * | 6/1971 | Harden et al. | 340/319 |
| 4,321,456 A | 3/1982 | Ohnmacht et al. | |
| 4,563,606 A * | 1/1986 | Fukasawa et al. | 310/208 |
| 4,919,189 A | 4/1990 | Sato et al. | |
| 5,300,855 A | 4/1994 | Kweon | |

(Continued)

FOREIGN PATENT DOCUMENTS

| | | |
|---|---|---|
| JP | 55-68551 | 5/1980 |
| JP | 56-166737 | 12/1981 |

(Continued)

OTHER PUBLICATIONS

Machine translation of Tanaka et al, JP 2007-259541 A.*

(Continued)

*Primary Examiner* — John K Kim
*Assistant Examiner* — Rohit Singh
(74) *Attorney, Agent, or Firm* — Wenderoth, Lind & Ponack, L.L.P.

(57) ABSTRACT

A synchronous motor which has reduced torque ripple while having a high torque includes a rotor and a stator, and U-phase coils, V-phase coils, and W phase coils are wound around sections of the yoke each located between two adjacent stator teeth. The number of turns in each coil and the direction in which each coil is wound are set to compensate for a difference between a timing at which a magnetic field produced at each stator tooth is at a maximum value and a timing at which a point between magnetic poles passes by the stator tooth as the rotor rotates, the difference in timing being caused by a difference between the interval between the magnetic poles and the interval between the stator teeth.

22 Claims, 19 Drawing Sheets

(56) References Cited

U.S. PATENT DOCUMENTS

| | | | |
|---|---|---|---|
| 6,590,312 B1 | 7/2003 | Seguchi et al. | |
| 7,161,270 B2* | 1/2007 | Han et al. | 310/156.81 |
| 2005/0046304 A1* | 3/2005 | Tamaki et al. | 310/254 |
| 2008/0157622 A1* | 7/2008 | Shah et al. | 310/184 |

FOREIGN PATENT DOCUMENTS

| | | |
|---|---|---|
| JP | 1-162557 | 6/1989 |
| JP | 3-32387 | 2/1991 |
| JP | 5-225929 | 9/1993 |
| JP | 7-87716 | 3/1995 |
| JP | 9-23689 | 1/1997 |
| JP | 10-225035 | 8/1998 |
| JP | 2000-72982 | 3/2000 |
| JP | 2001-268866 | 9/2001 |
| JP | 2005-171650 | 6/2005 |
| JP | 2006-345682 | 12/2006 |
| JP | 2007-128114 | 5/2007 |
| JP | 2007-209199 | 8/2007 |
| JP | 2007-259541 | 10/2007 |

OTHER PUBLICATIONS

Eng. Translation of Tanaka, Permanent Magnet Type Motor, Apr. 2007, JP 2007259541 A.*

International Search Report issued Nov. 9, 2010 in International (PCT) Application No. PCT/JP2010/004920.

* cited by examiner

D=π/9 radians

D=π/9 radians

γ=π/12 radians

This application is a U.S. National Phase Application under 35 USC 371 of International Application PCT/JP2010/ 004920 filed Aug. 5, 2010.

SYNCHRONOUS MOTOR AND SYSTEM FOR DRIVING SYNCHRONOUS MOTOR

TECHNICAL FIELD

The present invention relates to coil structure in synchronous motors, and in particular to technology for enhancing torque performance.

BACKGROUND ART

There is a particular desire for synchronous motors used in compressors, electric cars, hybrid cars, fuel cell-powered cars, and the like to produce high torque with low torque ripple, given the demand for motors that are small, lightweight, high-output, low-vibration, low-noise, and efficient.

In a surface magnet type synchronous motor, in which permanent magnets are disposed on the surface of a rotor core, the torque produced by the permanent magnet (magnetic torque) is at a maximum when the magnetic field produced by the permanent magnets and the armature current differ in phase by 90°, i.e. when the inter-polar gaps on the rotor and the stator teeth around which stator coils are wound oppose each other so that the current supplied to the stator coils is at a maximum. Any deviation from the 90° phase difference between the permanent magnet-produced magnetic fields and the armature current results in reduced torque.

Also, in an interior permanent magnet synchronous motor, in which the permanent magnets are arranged inside the core, in addition to magnetic torque from the permanent magnets, reluctance torque is also produced due to the salient polarity owing to the difference in magnetic reluctance caused by the positions of the rotor and stator. Reluctance torque is at a maximum when the phase difference between the permanent magnet-produced magnetic fields and the armature current is approximately 45°. Accordingly, the torque from an interior permanent magnet synchronous motor is a combination of magnetic torque and reluctance torque, and that torque is at a maximum when the phase difference between the magnetic fields and armature current is between 0° and approximately 45°.

Ordinarily, the torque of a synchronous motor includes a ripple component that is based on the influence of the harmonic component of the permanent magnet-produced magnetic fields, the influence of the harmonic component of the armature current, and the like. To address this issue, there exists technology for reducing torque ripple by mechanically offsetting the placement interval (angle) of the stator coils, through which flows current in a single phase, from the inter-polar gap (angle) of the rotor. Through the use of such technology, the phases of the torque ripple produced by the stator coils are offset from each other and the torque ripple can be negated. As a result, a low-vibration, low-noise motor can be achieved. The following documents disclose technology for achieving low-vibration and low-noise motors.

Patent Literature 1 discloses a motor provided with inner and outer teeth on an annular yoke, a plurality of coils toroidally wound around the teeth, an inner rotor corresponding to the inner teeth, and an outer rotor corresponding to the outer teeth, wherein the point at which poles of the outer rotor and of the inner rotor change are offset by any angle when the rotors are attached, thus achieving low vibration.

Patent Literature 2 discloses setting the magnetic salient pole of the outer rotor and the magnetic salient pole of the inner rotor to the same position in the circumferential direction, resulting in the radial components of the electromagnetic force between the magnetic salient poles of the outer and inner stator teeth offsetting each other, thereby decreasing vibration due to cycle variation.

CITATION LIST

Patent Literature

Patent Literature 1: Japanese Patent Application Publication No. 2007-209199
Patent Literature 2: Japanese Patent Application Publication No. 2001-268866

SUMMARY OF INVENTION

Technical Problem

As described above, if stator coils are wound around each of several stator teeth arranged at intervals that differ from the inter-polar gaps of the rotor, and if current in a single phase is supplied to such stator coils, the phase of the torque ripple produced by each of the stator teeth is offset, and as a result, the total torque ripple is reduced.

However, in the above-described structure, when a given stator tooth is in position with respect to a magnetic pole on the rotor to produce maximal torque, the stator teeth arranged with respect to the stator tooth at intervals that differ from the gaps between magnetic poles are offset from the position in which those teeth produce maximal torque, and thus torque production cannot be maximized. In other words, with conventional technology, the effect of torque ripple reduction is a problematic reduction in total torque.

The present invention has been achieved in view of the above problems, and it is an object thereof to provide technology for reducing torque ripple while moderating a reduction in torque.

Solution to Problem

A synchronous motor according to the present invention comprises: a rotor having a plurality of magnetic poles arranged around a circumference of the rotor at an equal interval; and a stator having a plurality of stator teeth arranged around a circumference of the stator, the stator teeth radially protruding from an annular yoke of the stator and differing in number from the magnetic poles, wherein the stator teeth form a plurality of stator teeth groups, each of the stator teeth groups including a predetermined number of stator teeth consecutive around the circumference of the stator, and the stator teeth groups being arranged circumferentially at an equal interval, the predetermined number of stator teeth included in each of the stator teeth groups are arranged at an interval different from the interval of the magnetic poles of the rotor, in correspondence with each stator tooth among the predetermined number of stator teeth, a main coil included in a coil of one phase is wound around at least one of two sections of the yoke respectively located between the stator tooth and a stator tooth adjacent on either side, and in at least one of the predetermined number of stator teeth in a certain stator teeth group, a sub-coil included in a coil of a different phase than the one phase is further wound around the at least one of two sections of the yoke and is connected in series with the main coil included in another stator teeth group located at a different electrical angle than the certain stator teeth group, and the number of turns in each coil and a direction in which each coil is wound are set to compensate for a difference between a timing at which a magnetic field, produced at each stator tooth by applying, to each of the coils, a corresponding phase of three-phase alternating current, is at a maximum value and a timing at which a point between magnetic poles passes by the stator tooth as the rotor rotates, the difference in timing being caused by a difference between the interval between adjacent magnetic poles and the interval between the stator teeth.

Advantageous Effects of Invention

The synchronous motor of the present invention achieves the following advantageous effects.

With the above structure, in each stator teeth group, the interval between the predetermined number of stator teeth differs from the interval between the magnetic poles of the rotor. Therefore, the cogging torque, i.e. torque ripple while no electrical power is being supplied, is reduced.

Furthermore, with the above structure, the main coil and sub-coil wound in correspondence with one stator tooth are parts of coils of different phases. As a result, the magnetic field produced at the stator tooth is a vector combination of the magnetic field due to the main coil and the magnetic field due to the sub-coil. The magnitude and phase of the magnetic field obtained by this vector combination can freely be adjusted by adjusting the number of turns in the main coil and the sub-coil. Accordingly, even if the interval between stator teeth differs from the interval between the magnetic poles of the rotor, the maximum amount of torque is produced at all of the stator teeth, resulting in an overall increase in torque.

Note that with this structure, concentrated winding is used in the main coil and the sub-coil, thus lowering the coil ends and shortening the length of the coils as compared to a synchronous motor adopting distributed winding. Such a structure therefore achieves a compact, efficient synchronous motor.

A synchronous motor driving system according to the present invention is formed by a synchronous motor and a corresponding actuator device, wherein the synchronous motor comprises: a rotor having a plurality of magnetic poles arranged around a circumference of the rotor at an equal interval; and a stator having a plurality of stator teeth protruding from an annular yoke of the stator and differing in number from the magnetic poles, a plurality of stator coils being wound separately in correspondence with each stator tooth around sections of the yoke respectively located between the stator tooth and a stator tooth adjacent on either side, wherein the stator coils form stator coil groups, each stator coil group including m stator coils consecutive around a circumference of the stator, m being an integer two or greater, and the stator coil groups being arranged circumferentially at an equal interval, in each stator coil group, among the m stator coils, at least a pair of adjacent stator coils are arranged at a different interval than the interval between the magnetic poles of the rotor and are respectively connected to individual external terminals, and the actuator device provides current to the stator coils by providing currents of different phases to the pair of adjacent stator coils in each stator coil group via the external terminals connected thereto, the currents of different phases being set to compensate for a difference between a timing at which a magnetic field produced at each stator tooth is at a maximum value and a timing at which a point between magnetic poles passes by the stator tooth as the rotor rotates, the difference in timing being caused by a difference between the intervals between the magnetic poles and the interval between the stator teeth.

With the above structure, the interval between the pair of stator coils differs from the interval between the magnetic poles of the rotor. Therefore, the cogging torque, i.e. torque ripple while no electrical power is being supplied, is reduced. Furthermore, the pair of stator coils are respectively connected to individual external terminals, and currents of differing phases are provided to the stator coils. In other words, it is possible to individually control the difference in phase between the magnetic field produced by the magnetic poles of the rotor and the armature current provided to the stator coil. As a result, torque ripple is reduced while moderating a decrease in torque.

Note that with this structure, concentrated winding is used in the stator coils, thus lowering the coil ends and shortening the length of the coils as compared to a synchronous motor adopting distributed winding. Such a structure therefore achieves a compact, efficient synchronous motor.

Furthermore, the above structure increases the degree of freedom for choosing a combination of the number of magnetic poles and the number of stator teeth. For example, 30 teeth are usually used in combination with 20 poles, but the above structure allows for a combination with fewer stator teeth than magnetic poles, such as 18 teeth for 20 poles. Decreasing the number of teeth relative to the number of poles is useful for decreasing the size of the motor and decreasing the number of coils.

Note that with this structure, the first coil and the second coil are wound around the section of the yoke by concentrated winding, thus lowering the coil ends and shortening the length of the coils as compared to a synchronous motor adopting distributed winding. Such a structure therefore achieves a compact, efficient synchronous motor.

DESCRIPTION OF EMBODIMENTS

An Embodiment of the present invention is described below with reference to the drawings.

1. Embodiment 1

Figure 1:
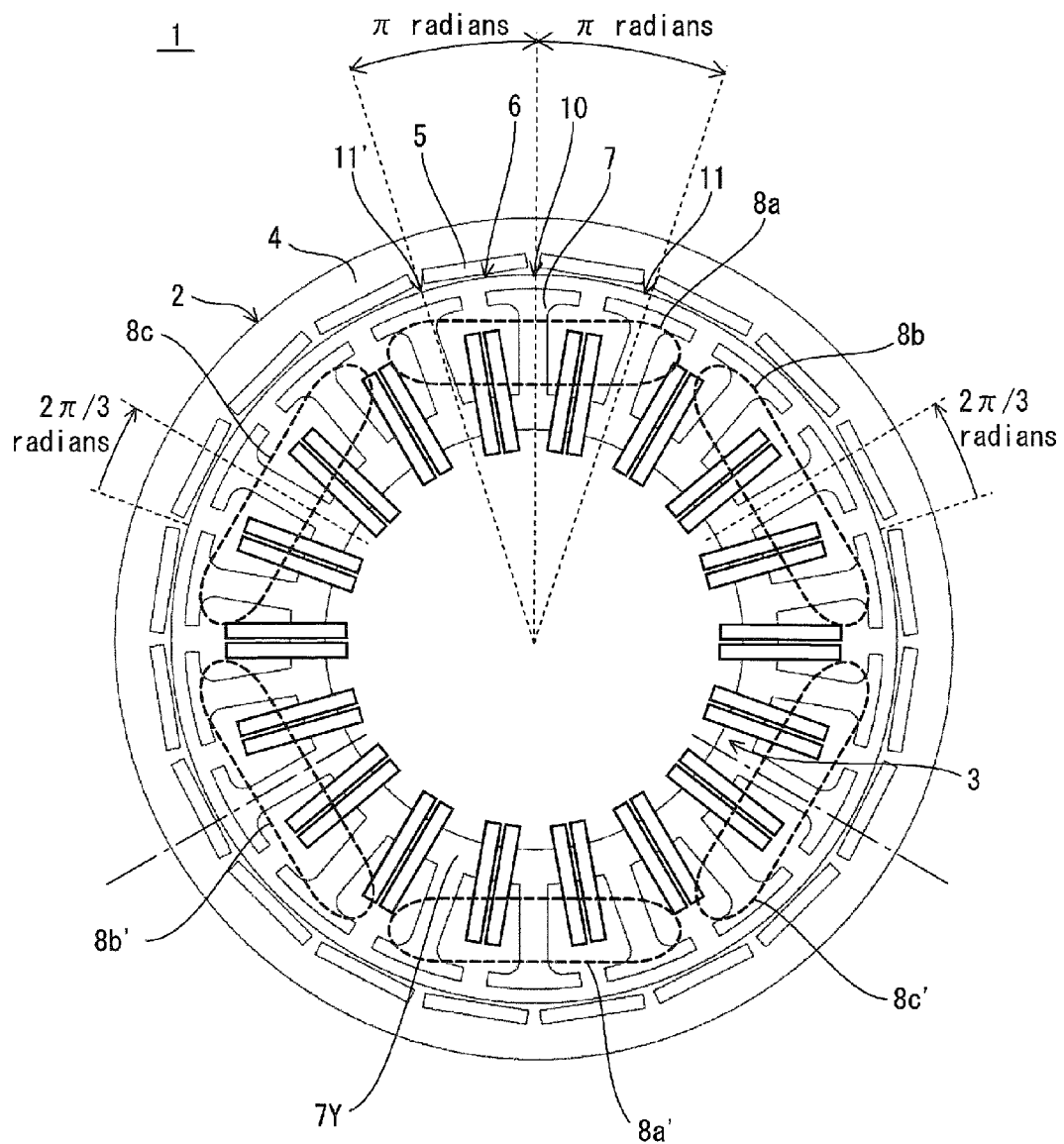
FIG. 1 is a plan view of a synchronous motor forming a synchronous motor driving system according to an Embodiment of the present invention.
Figure 2:
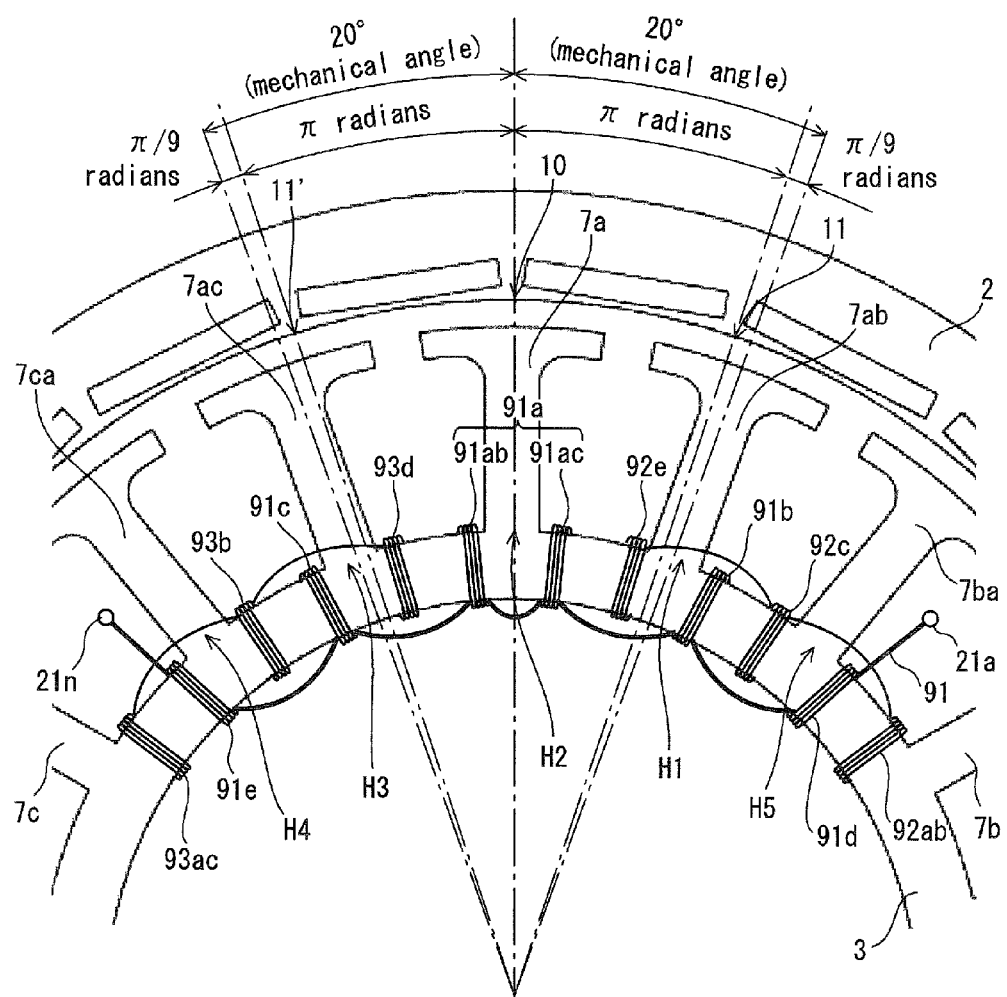
FIG. 2 is a plan view of a synchronous motor according to Embodiment 1.

FIG. 1 is a plan view of a synchronous motor in the synchronous motor driving system according to Embodiment 1 of the present invention, and FIG. 2 shows details on the synchronous motor in FIG. 1. The synchronous motor 1 is an outer-rotor synchronous motor, in which the rotor is provided at the outer periphery of the stator, and includes a rotor 2 and a stator 3.

The rotor 2 includes a rotor core 4 and a plurality of permanent magnets 5. The permanent magnets 5 are arranged on the rotor core 4 at equal intervals along the circumferential direction of the rotor 2. The permanent magnets 5 form magnetic poles 6 composed of pairs of N and S poles. The N poles and the S poles are alternately arranged around the stator 3. A pair of north and south magnetic poles forms an electrical angle of $2\pi$ radians. The interval between two adjacent magnetic poles is $\pi$ radians in terms of electrical angle. In the present Embodiment, the rotor has 20 magnetic poles. Thus, the electrical angle is 10 times the mechanical angle.

The stator 3 includes an annular stator yoke 7Y, 18 stator teeth 7 (7a, 7ac, 7ab, ...) extending radially from the stator yoke 7Y towards the rotor 2, and stator coils (91a, 91c, 91b, 93d, 92e, ...) each wound around a section of the stator yoke 7Y (hereinafter referred to as "stator yoke section") between neighboring stator teeth. The stator coils wound around the stator yoke sections include main coils and sub-coils. The stator coils with a greater number of turns are referred to as the main coils, and the stator coils with a fewer number of turns are referred to as the sub-coils.

Every adjacent three of the stator teeth 7 belong to a different stator teeth group 8 (8a, 8b, 8c, 8a', 8b', 8c'). The number of the magnetic poles arranged in the rotation direction of the rotor 2 is 20 in total. The number of the stator teeth is 18 in total. That is, the magnetic poles and the stator teeth are displaced from each other and occur at a ratio of 10 to 9 per semicircle.

Assume in FIG. 1 that the counter-clockwise direction is the + direction of the rotation. With respect to the stator teeth group 8a, the stator teeth group 8b is provided with an offset of −60° in terms of mechanical angle, or +2π/3 radians in terms of electrical angle. With respect to the stator teeth group 8a, the stator teeth group 8c is provided with an offset of +60° in terms of mechanical angle, or +4π/3 radians (−2π/3 radians) in electrical angle. Thus, the stator teeth group 8a, the stator teeth group 8b and the stator teeth group 8c are provided every $\frac{2}{3}\pi$ radians in electrical angle. In the synchronous motor pertaining to the present embodiment, the combination of the stator teeth group 8a, the stator teeth group 8b, and the stator teeth group 8c is provided twice in the rotation direction (i.e. the stator teeth group 8a', the stator teeth group 8b', and the stator teeth group 8c' are provided as well).

The following describes details of the structure of the stator teeth group 8a, with reference to FIG. 2.

As shown in FIG. 2, the stator teeth group 8a includes a reference stator tooth 7a, which indicates the phase relationship with the rotor, and neighboring stator teeth 7ab and 7ac. Taking the counter-clockwise direction as positive, the stator tooth 7ab is located at a position π/9 radians behind a position that is offset from the stator tooth 7a by an electrical angle of π radians, and the stator tooth 7ac is located at a position π/9 radians ahead of a position that is offset from the stator tooth 7a by an electrical angle of π radians.

Figure 3:
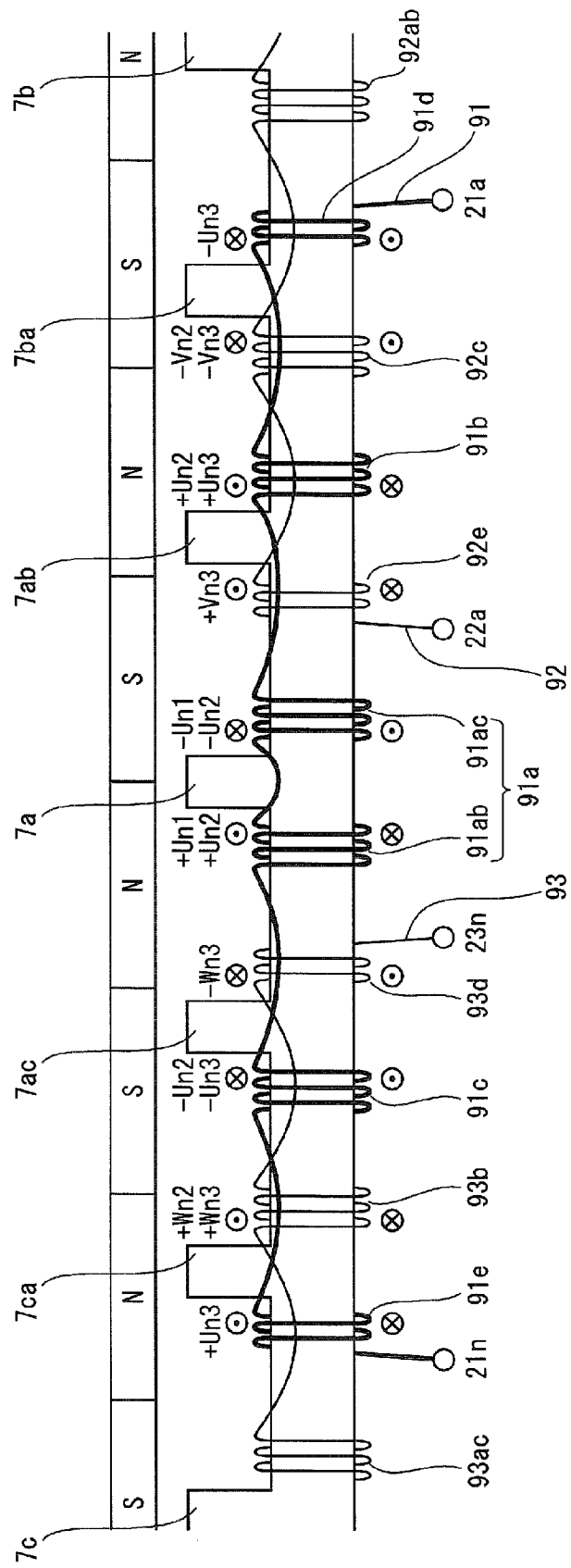
FIG. 3 is a conceptual diagram of the structure of stator coils wound around stator teeth according to Embodiment 1.

FIG. 3 is a conceptual diagram of the structure of the stator coils wound around the stator teeth.

The synchronous motor 1 is driven in three phases, a U-phase, a V-phase, and a W-phase, using one three-phase alternating current power source. Each of the stator coils is provided current in one of the three phases. Hereinafter, the stator coils in which current of the first phase (U phase) flows are referred to as U-phase coils, the stator coils in which current of the second phase (V phase) flows are referred to as V-phase coils, and the stator coils in which current of the third phase (W phase) flows are referred to as W-phase coils.

As shown in FIG. 3, stator coils in which current of the same phase flows are wound around the stator yoke sections on either side of the reference stator tooth that indicates the phase relationship with the rotor. Around the stator yoke section on one side of each neighboring stator tooth are wound stator coils in which current of the same phase as the stator coils of the reference stator flows, and around the stator yoke section on the other side are wound stator coils in which current of a different phase flows. Specifically, a U-phase coil 91ab is wound around the stator yoke section to the left of the reference stator tooth 7a that indicates the phase relationship with the rotor, and a U-phase coil 91ac is wound around the stator yoke section to the right. The U-phase coil 91ab and the U-phase coil 91ac are together referred to as a U-phase coil 91a.

A U-phase coil 91b is wound around the stator yoke section to the right of the stator tooth 7ab, and a V-phase coil 92e is wound around the stator yoke section to the left. A U-phase coil 91c is wound around the stator yoke section to the left of the stator tooth 7ac, and a W-phase coil 93d is wound around the stator yoke section to the right. A U-phase coil 91d is wound around the stator yoke section to the right of the stator tooth 7ba, and a V-phase coil 92c is wound around the stator yoke section to the left. A U-phase coil 91e is wound around the stator yoke section to the left of the stator tooth 7ca, and a W-phase coil 93b is wound around the stator yoke section to the right. The number of turns and the direction of winding in each coil are described below.

The U-phase coils 91a, 91b, and 91c included in the stator teeth group 8a, the U-phase coil 91d included in the stator teeth group 8b, and the U-phase coil 91e included in the stator teeth group 8c are connected in series to form one U-phase coil 91. In this case, the U-phase coils 91a, 91b, and 91c are the main coils, and the U-phase coils 91d and 91e are the sub-coils. An end 21a of the U-phase coil 91 is connected to a U-phase input terminal, and an end 21n of the U-phase coil 91 is connected to a neutral point. Note that for the sake of convenience, the coils are referred to as being "connected in series". However, this structure is not limited to winding coils individually around each stator tooth for connection afterwards, but also includes continually winding one coil around the stator teeth.

Like the U-phase coil 91, a V-phase coil 92 includes the following coils connected in series: V-phase coils included in the stator teeth group 8b (a coil (92ab) wound around the stator yoke section to the left of a stator tooth 7b and a coil wound around the stator yoke section to the right, a coil wound around the stator yoke section to the right of the stator yoke section on the right side the stator tooth 7b, and a coil (92c) wound around the stator yoke section to the left of the stator tooth (7ba) on the left side of the stator tooth 7b), a V-phase coil included in the stator teeth group 8c', and a V-phase coil (92e) included in the stator teeth group 8a. An end 22a of the V-phase coil 92 is connected to a V-phase input terminal, and the other end of the V-phase coil 92 is connected to a neutral point.

Similarly, a W-phase coil 93 includes the following coils connected in series: W-phase coils included in the stator teeth group 8c (a coil wound around the stator yoke section to the left of a stator tooth 7c and a coil (93ac) wound around the stator yoke section to the right, a coil (93b) wound around the stator yoke section to the right of a stator tooth (7ca) on the right side the stator tooth 7c, and a coil wound around the stator yoke section to the left of the stator tooth on the left side of the stator tooth 7c), a W-phase coil included in the stator teeth group 8b', and a W-phase coil (93d) included in the stator teeth group 8a. An end of the W-phase coil 93 is connected to a W-phase input terminal, and the other end (23n) of the stator coil 93 is connected to a neutral point.

In the synchronous motor 1, the combination of the stator coils 91, 92, and 93 is provided twice in the rotation direction.

1.1 Magnetic Fields Produced at Stator Teeth

Figure 4:
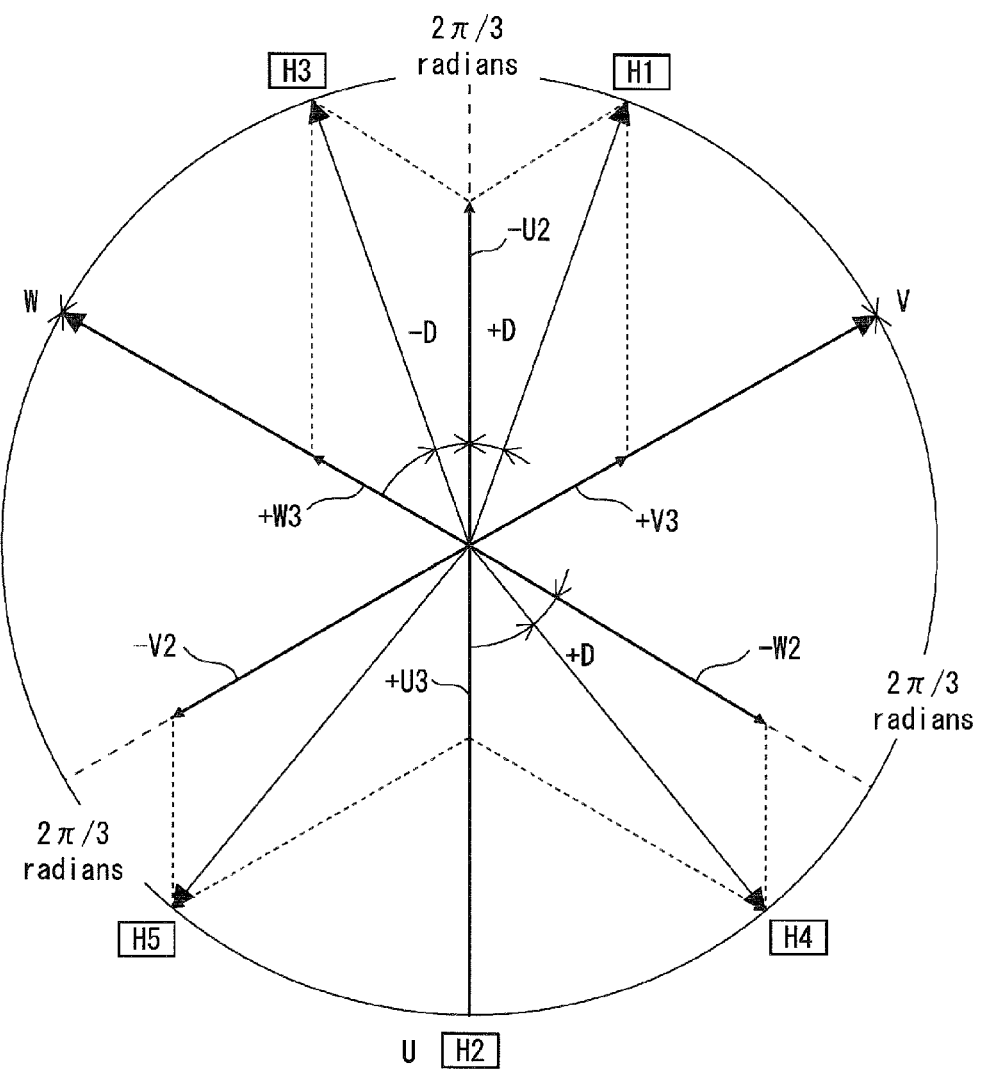
FIG. 4 is a vector diagram showing the magnitudes and phases of magnetic fields according to Embodiment 1.

FIG. 4 is a vector diagram showing the magnitudes and phases of magnetic fields according to Embodiment 1 of the present invention. The magnetic fields produced at the stator teeth are described with reference to FIGS. 2, 3, and 4.

The synchronous motor 1 is a three-phase synchronous motor, and the phase difference between the U-phase, V-phase, and W-phase current is an electrical angle of $2\pi/3$ radians. When the U-phase current reaches a maximum, the vector of the magnetic field produced by the current flowing in the U-phase coil 91 (91a) of the stator tooth 7a is shown as H2 in FIG. 4. When the U-phase current reaches the maximum, the vector of the magnetic field produced by the current flowing in the U-phase coil 91 (91b) of the stator tooth 7ab is shown as −U2 in FIG. 4, and the vector of the magnetic field produced by the current flowing in the V-phase coil 92 (92e) of the stator tooth 7ab is shown as V3 in FIG. 4. The vector of the magnetic field obtained by combining the two is shown as H1 in FIG. 4. When the U-phase current reaches the maximum, the vector of the magnetic field produced by the current flowing in the U-phase coil 91 (91c) of the stator tooth 7ac is shown as −U2 in FIG. 4, and the vector of the magnetic field produced by the current flowing in the W-phase coil 93 (93d) of the stator tooth 7ac is shown as W3 in FIG. 4. The vector of the magnetic field obtained by combining the two is shown as H3 in FIG. 4.

In FIG. 2, the stator tooth 7ab is located at a position $\pi/9$ radians behind a position that is offset from the stator tooth 7a by an electrical angle of $\pi$ radians. Given this positional relationship for the stator tooth 7ab, then in terms of electrical angle, the magnetic field H1 is produced $\pi/9$ radians ahead of a position $\pi$ radians from the magnetic field H2, and thus when the axis of the stator tooth 7ab and the point 11 between the rotor magnetic poles coincide, a magnetic field at maximum magnitude is produced at the stator tooth 7ab. Additionally, a magnetic field at maximum magnitude is also produced at the stator tooth 7a when the axis of the stator tooth 7a and the point 10 between the rotor magnetic poles coincide.

Also, in FIG. 2, the stator tooth 7ac is located at a position $\pi/9$ radians ahead of a position that is offset from the stator tooth 7a by an electrical angle of $\pi$ radians. Given this positional relationship for the stator tooth 7ac, then in terms of electrical angle, the magnetic field H3 is produced $\pi/9$ radians behind a position $\pi$ radians from the magnetic field H2, and thus when the axis of the stator tooth 7a and the point 10 between the rotor magnetic poles coincide, a magnetic field at maximum magnitude is produced at the stator tooth 7a. Additionally, a magnetic field at maximum magnitude is produced at the stator tooth 7ac when the axis of the stator tooth 7ac and the point 11' between the rotor magnetic poles coincide.

As shown, in the present Embodiment, when the axes of the stator teeth and the points between the rotor magnetic poles coincide, the stator teeth-produced magnetic fields are at maximum magnitude, and so the magnetic torque produced by each of the stator teeth is also maximized, which in turn increases the total torque. Also, the torque produced by each of the stator teeth is nearly uniform, which reduces torque ripple.

1.2 Detailed Description of Number of Turns

An example of the number of turns in each coil and the direction of winding that are necessary to produce the above magnetic fields are described with reference to FIGS. 3 and 4.

Let the number of turns of the U-phase coil 91ab for producing the U-phase magnetic field H2 at the stator tooth 7a be +Un1, and the number of turns of the U-phase coil 91ac be −Un1. The +/− signs in front of the number of turns respectively indicate that the coil is wound in a direction that produces a magnetic field in the clockwise direction around the stator yoke section (hereinafter, the + direction) and that the coil is wound in a direction that produces a magnetic field in the counter-clockwise direction around the stator yoke section (hereinafter, the − direction). +Un1 and −Un1 indicate opposite winding directions, whereas the number of turns Un1 is the same.

By producing a magnetic field at the stator tooth 7ab that is a combination of the U-phase magnetic field −U2 and the V-phase magnetic field +V3, the magnetic field at the stator tooth 7ab is at a maximum magnitude when the axis of the stator tooth 7ab and the point between the rotor magnetic poles coincide. Specifically, let the number of turns of the U-phase coil 91ac for producing the U-phase magnetic field −U2 at the stator tooth 7ab be −Un2, and the number of turns of the U-phase coil 91b be +Un2. Let the number of turns of the V-phase coil 92e for producing the V-phase magnetic field +V3 at the stator tooth 7ab be +Vn3, and the number of turns of the V-phase coil 92c be −Vn3.

By producing a magnetic field at the stator tooth 7ac that is a combination of the U-phase magnetic field −U2 and the W-phase magnetic field +W3, the magnetic field at the stator tooth 7ac is at a maximum magnitude when the axis of the stator tooth 7ac and the point between the rotor magnetic poles coincide. Let the number of turns of the U-phase coil 91c for producing the U-phase magnetic field −U2 at the stator tooth 7ac be −Un2, and the number of turns of the U-phase coil 91ab be +Un2. Let the number of turns of the W-phase coil 93b for producing the W-phase magnetic field +W3 at the stator tooth 7ac be +Wn3, and the number of turns of the W-phase coil 93d be −Wn3.

By producing a magnetic field at the stator tooth 7ca that is a combination of the U-phase magnetic field +U3 and the W-phase magnetic field −W2, the magnetic field at the stator tooth 7*ca* is at a maximum magnitude when the axis of the stator tooth 7*ca* and the point between the rotor magnetic poles coincide. Let the number of turns of the U-phase coil 91*e* for producing the U-phase magnetic field +U3 at the stator tooth 7*ca* be +Un3, and the number of turns of the U-phase coil 91*c* be −Un3. Let the number of turns of the W-phase coil 93*ac* for producing the W-phase magnetic field −W2 at the stator tooth 7*ca* be −Wn2, and the number of turns of the W-phase coil 93*b* be +Wn2.

By producing a magnetic field at the stator tooth 7*ba* that is a combination of the U-phase magnetic field +U3 and the V-phase magnetic field −V2, the magnetic field at the stator tooth 7*ba* is at a maximum magnitude when the axis of the stator tooth 7*ba* and the point between the rotor magnetic poles coincide. Let the number of turns of the U-phase coil 91*b* for producing the U-phase magnetic field +U3 at the stator tooth 7*ba* be +Un3, and the number of turns of the U-phase coil 91*d* be −Un3. Let the number of turns of the V-phase coil 92*c* for producing the V-phase magnetic field −V2 at the stator tooth 7*ba* be −Vn2, and the number of turns of the V-phase coil 92*ac* be +Vn2.

In this case, focusing on the U-phase coils among the above coils, the number of turns of the coil 91*e* is +Un3, the number of turns of the coil 91*c* is the sum of −Un2 and −Un3, and the number of turns of the coil 91*ab* is the sum of +Un1 and +Un2. The number of turns of the coil 91*ac* is the sum of −Un1 and −Un2, the number of turns of the coil 91*b* is the sum of +Un2 and +Un3, and the number of turns of the coil 91*d* is −Un3.

In the present Embodiment, the number of magnetic poles is 20, the number of stator teeth is 18, and the number of magnetic pole pairs is 20/2=10. The number of stator teeth per phase is 18/3=6, which is a multiple of 3. Accordingly, a coil coefficient α can be calculated according to the equations below.

$$\alpha = |2\pi/A - 2\pi/B| \times P$$

$$= |2\pi/20 - 2\pi/18| \times 10$$

$$= \pi/9 \text{ radians}$$

The relationship between Un2 and Un1, and the relationship between Vn3 and Vn1, are as follows.

$$Un2 = (Un1) \times \sin(\pi/3 - \alpha)/\sin(\pi/3)$$

$$= (Un1) \times \sin(2\pi/9)/\sin(\pi/3)$$

$$Vn3 = (Vn1) \times \sin(\alpha)/\sin(\pi/3)$$

$$= (Vn1) \times \sin(\pi/9)/\sin(\pi/3)$$

As shown in FIG. 4, the magnetic field of combined vectors at the stator tooth 7*ab* produced with the above number of turns is equivalent to the magnetic field at the stator tooth 7*ab* produced by supplying only current of a phase that is π/9 radians ahead of the −U phase, which is the opposite (i.e. offset by π radians) of the U-phase indicated at the stator tooth 7*a*.

With a proportionality coefficient K=(Un1)/sin(π/3), the number of turns of the U-phase coil 91*e* is +Un3, and the following equations hold.

$$+Un3 = (Un1) \times \sin(\alpha)/\sin(\pi/3)$$

$$= \{(Un1)/\sin(\pi/3)\} \times \sin(\alpha)$$

$$= \{\sin(\alpha)\} \times K$$

The number of turns of the U-phase coil 91*c* is −Un3−Un2, and the following equations hold.

$$-Un3 - Un2 = -(Un1) \times \sin(\alpha)/\sin(\pi/3) - (Un1) \times$$

$$\sin(\pi/3 - \alpha)/\sin(\pi/3)$$

$$= -\{(Un1)/\sin(\pi/3)\}\{\sin(\alpha) + \sin(\pi/3 - \alpha)\}$$

$$= -\{\sin(\alpha) + \sin(\pi/3 - \alpha)\} \times K$$

The number of turns of the U-phase coil 91*ab* is +Un2+Un1, and the following equations hold.

$$+Un2 + Un1 = (Un1) \times \sin(\pi/3 - \alpha)/\sin(\pi/3) + (Un1)$$

$$= (Un1) \times \{1 + \sin(\pi/3 - \alpha)/\sin(\pi/3)\}$$

$$= \{(Un1)/\sin(\pi/3)\} \times \{1 \times \sin(\pi/3) + \sin(\pi/3 - \alpha)\}$$

$$= \{\sin(\pi/3) + \sin(\pi/3 - \alpha)\} \times K$$

The number of turns of the U-phase coil 91*ac* is −Un1−Un2, and the following equation holds.

$$-Un1-Un2=-\{\sin(\pi/3)+\sin(\pi/3-\alpha)\}\times K$$

The number of turns of the U-phase coil 91*b* is +Un2+Un3, and the following equation holds.

$$+Un2+Un3=\{\sin(\pi/3-\alpha)+\sin(\alpha)\}\times K$$

The number of turns of the U-phase coil 91*d* is −Un3, and the following equation holds.

$$-Un3=-\{\sin(\alpha)\}\times K$$

Letting the number of turns of the U-phase coils 91*e*, 91*c*, 91*ab*, 91*ac*, 91*b*, and 91*d* respectively be +N1, −N2, +N3, −N3, +N2, and −N1, letting α be π/9 radians, and letting K be 100, the specific values of N1, N2, and N3 are as follows.

$$N1=\{\sin(\alpha)\}\times 100\approx 34 \text{ (turns)}$$

$$N2=\{\sin(\pi/3-\alpha)+\sin(\alpha)\}\times 100\approx 98 \text{ (turns)}$$

$$N3=\{\sin(\pi/3)+\sin(\pi/3-\alpha)\}\times 100\approx 151 \text{ (turns)}$$

Note that in the above equations, the sign "≈" is used to indicate that the right-hand side and the left-hand side of the equations are approximately equal. This is because in practice, it is difficult to make these values match exactly. The signs above are assumed to represent the cases where, for example, the right side is a decimal that can be rounded off to the nearest integer. Moreover, a difference that is negligible as a design error may be included in the cases. The numbers of turns in the V-phase and the W-phase, which are respectively offset by intervals of 2π/3 radians with respect to the U-phase, are determined in the same way as for the U-phase. The numbers of turns of the coil wound around the stator yoke section are repetitions of (N1+N3) turns, (N2+N2) turns, and (N3+N1) turns, i.e. combinations of types of two coils among the above three phases.

In the present Embodiment, the stator coils are wound around the stator yoke section by concentrated winding. Such concentrated winding reduces the size of the coil at the ends of the stator, i.e. the coil ends, thus yielding a compact synchronous motor. The coil ends are sections that do not contribute to torque even when current flows therein, thus reducing copper loss, i.e. joules lost due to coil resistance when current is flowing, which is highly efficient.

Furthermore, in the present Embodiment, an outer rotor is used, i.e. the rotor is arranged at the outer perimeter of the stator. Therefore, the rotor diameter can be increased in comparison to other motors of the same volume, such as an inner rotor where the rotor is arranged at the inner perimeter of the stator. Accordingly, effective magnetic flux reduction can be prevented with no need to reduce the size of the permanent magnets, even in a synchronous motor that has 20 poles such as that of the present Embodiment.

In the synchronous motor of the present Embodiment, the number of rotor magnetic poles is 20 and the number of stator teeth is 18. However, the number of stator teeth may be 9, 27, or any other multiple of 9, and the number of rotor magnetic poles may be any multiple of 10, such that the combination is 10q poles to 9q teeth (q being a positive integer). This allows for the above-described positional relationships in terms of electrical angle, thus obtaining the same effects.

Through a structure in which one or both of the stator teeth and the rotor magnetic poles are made to revolve in the direction of the rotation axis, magnetic flux variations are smoothed out and a low-vibration synchronous motor can be achieved.

Furthermore, by using iron powder magnetic cores, laminated magnetic material, or amorphous magnetic material for the magnetic material in the stator, iron loss can be greatly reduced and a better high-efficiency synchronous motor can be achieved.

In addition, by using a structure with multiple permanent magnets each comprising one pole, eddy current losses that occur due to the permanent magnets are reduced, achieving a more highly efficient synchronous motor.

Also, the surface area of the coils can be increased by using multiple small-diameter coils or by using flat, rectangular wire, which reduces skin effects during high-frequency driving to achieve a high-efficiency synchronous motor.

2. Embodiment 2

The difference between Embodiment 2 and Embodiment 1 is that a rotor is provided not only at the outer perimeter of the stator but also at the inner perimeter thereof, and accordingly, the stator is provided with stator teeth not only at the outer diameter of the stator, but also at the inner diameter of the stator.

Figure 5:
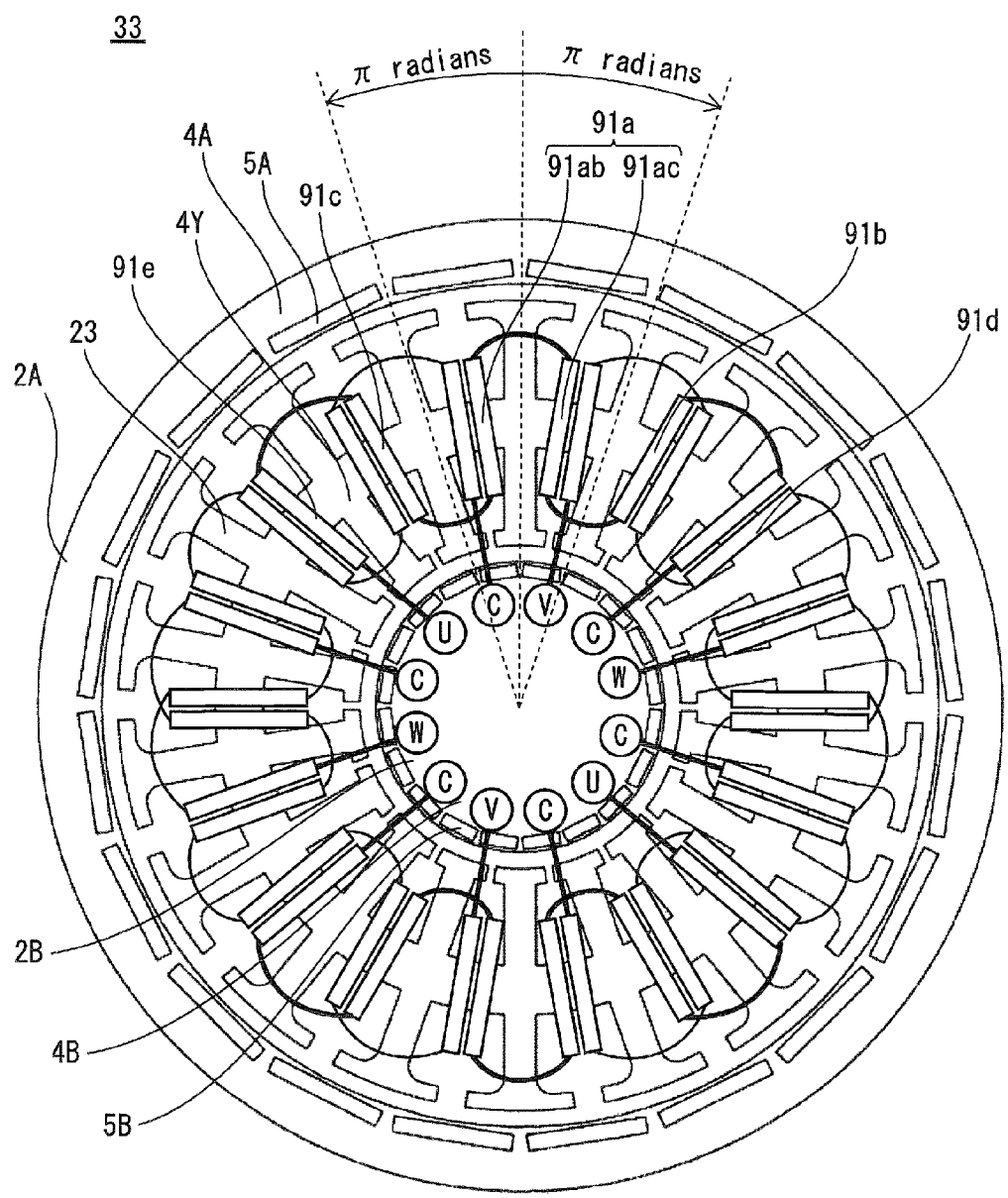
FIG. 5 is a plan view of a synchronous motor according to Embodiment 2.

FIG. 5 is a plan view of a synchronous motor according to the present Embodiment.

Figure 6:
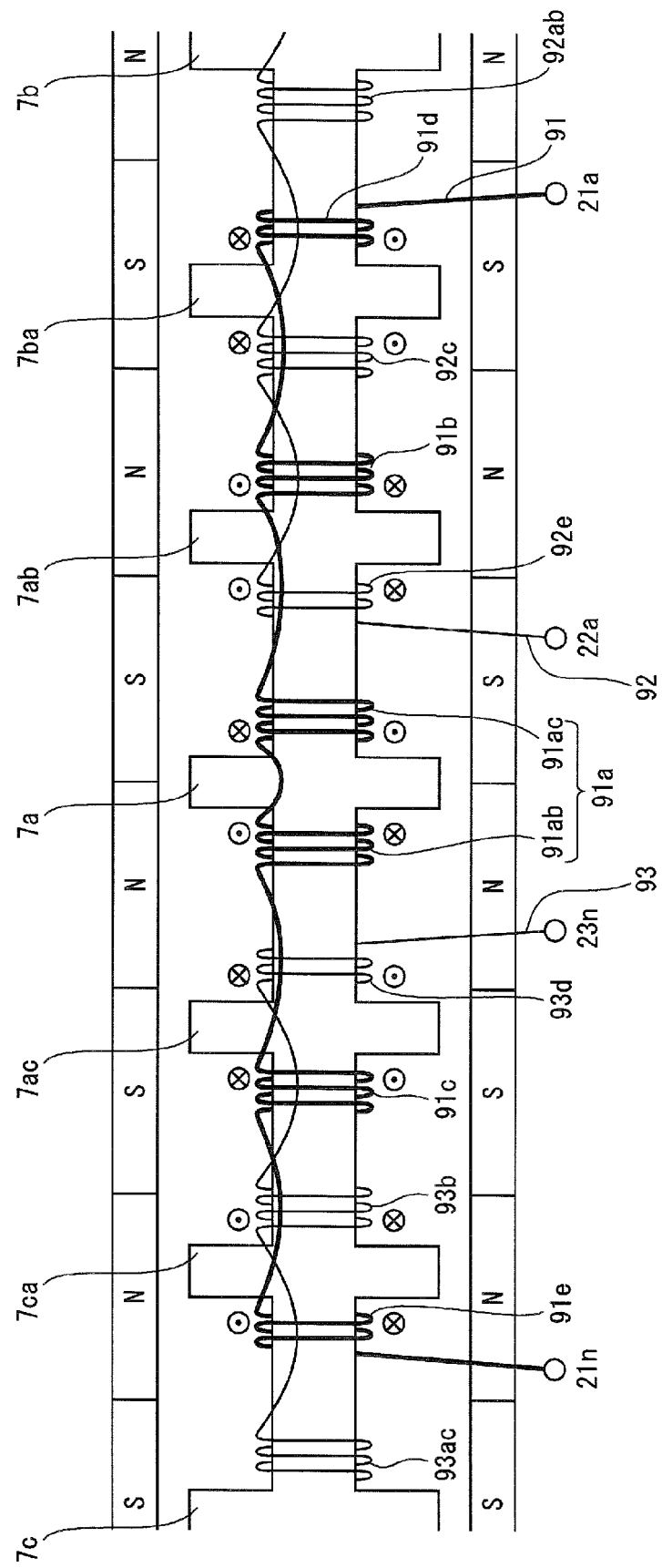
FIG. 6 is a schematic diagram of the coil structure of the synchronous motor according to Embodiment 2.

FIG. 6 is a schematic diagram of the coil structure of the synchronous motor according to the present Embodiment.

A synchronous motor 33 includes rotors 2A and 2B and a stator 23.

The rotor 2A on the outside of the stator 23 includes a rotor core 4A and 20 permanent magnets 5A. The permanent magnets 5A are arranged on the rotor core 4A at equal intervals along the circumferential direction of the rotor 2A. A pair of N and S magnetic poles of the permanent magnets 5A are arranged alternately to form an electrical angle of $2\pi$ radians. The interval between two adjacent magnetic poles shown by the dashed line in FIG. 5 is $\pi$ radians in terms of electrical angle. Similarly, the rotor 2B on the inside of the stator 23 includes a rotor core 4B and 20 permanent magnets 5B. The permanent magnets 5B are arranged on the rotor core 4B at equal intervals along the circumferential direction of the rotor 2B. A pair of N and S magnetic poles of the permanent magnets 5B are arranged alternately to form an electrical angle of $2\pi$ radians. The interval between two adjacent magnetic poles shown by the dashed line in FIG. 5 is $\pi$ radians in terms of electrical angle.

The coils are the same as in Embodiment 1.

With the above structure, stator teeth are provided not only at the outer diameter of the stator, but also at the inner diameter of the stator. Magnetic flux produced when supplying current to the coils around the stator yoke flows both in the rotor at the outer diameter and the rotor at the inner diameter of the stator. Since rotors are provided both at the outer periphery and the inner periphery of the stator, the coils have a high coefficient of use, thus easily achieving a synchronous motor with high torque.

3. Embodiment 3

The present Embodiment differs from Embodiment 1 in the number of turns and the connections of the coils.

Two types of stator coils are wound around each of two neighboring stator yoke sections, and one type of stator coil is wound around each of the stator yoke sections adjacent to these two neighboring stator yoke sections. The following explanation focuses on the differences with Embodiment 1.

3.1 Structure

Figure 7:
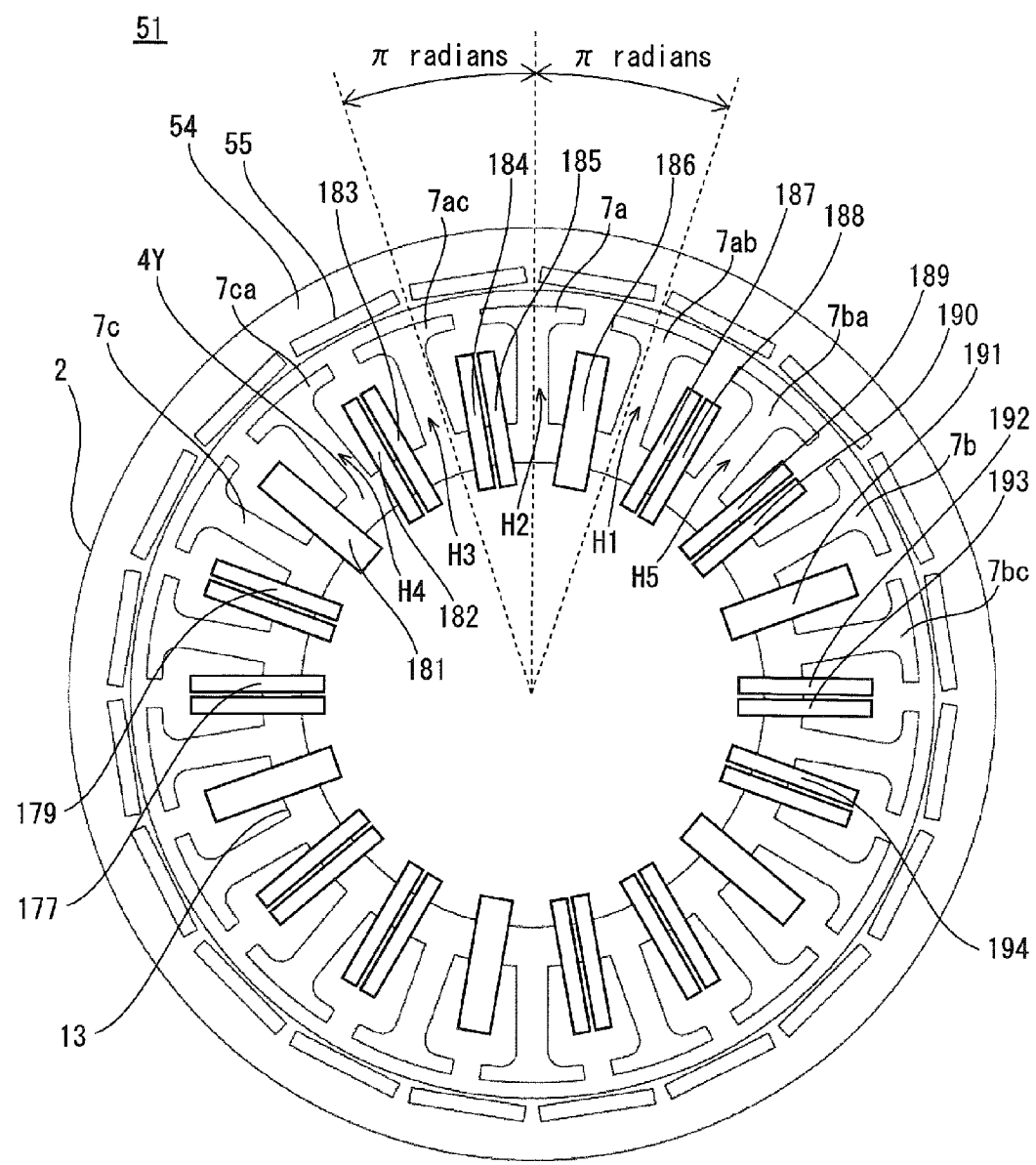
FIG. 7 is a plan view of a synchronous motor according to Embodiment 3.
Figure 8:
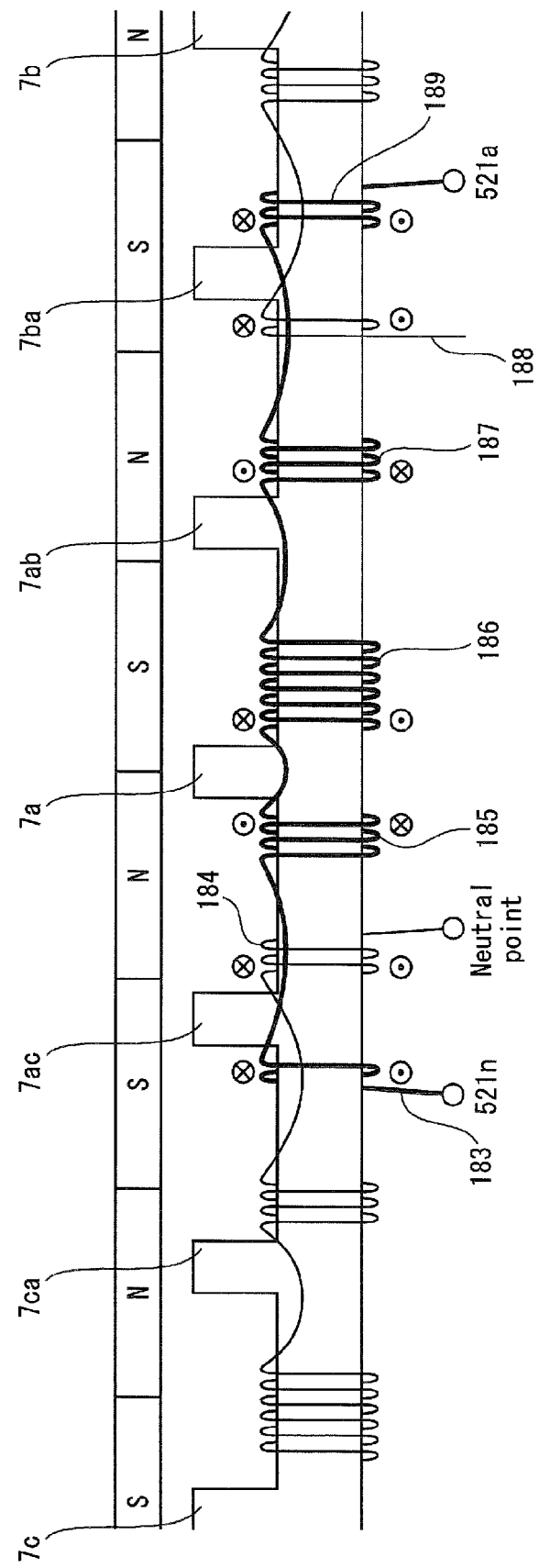
FIG. 8 is a structural diagram of the coils in the synchronous motor according to Embodiment 3.
Figure 9:
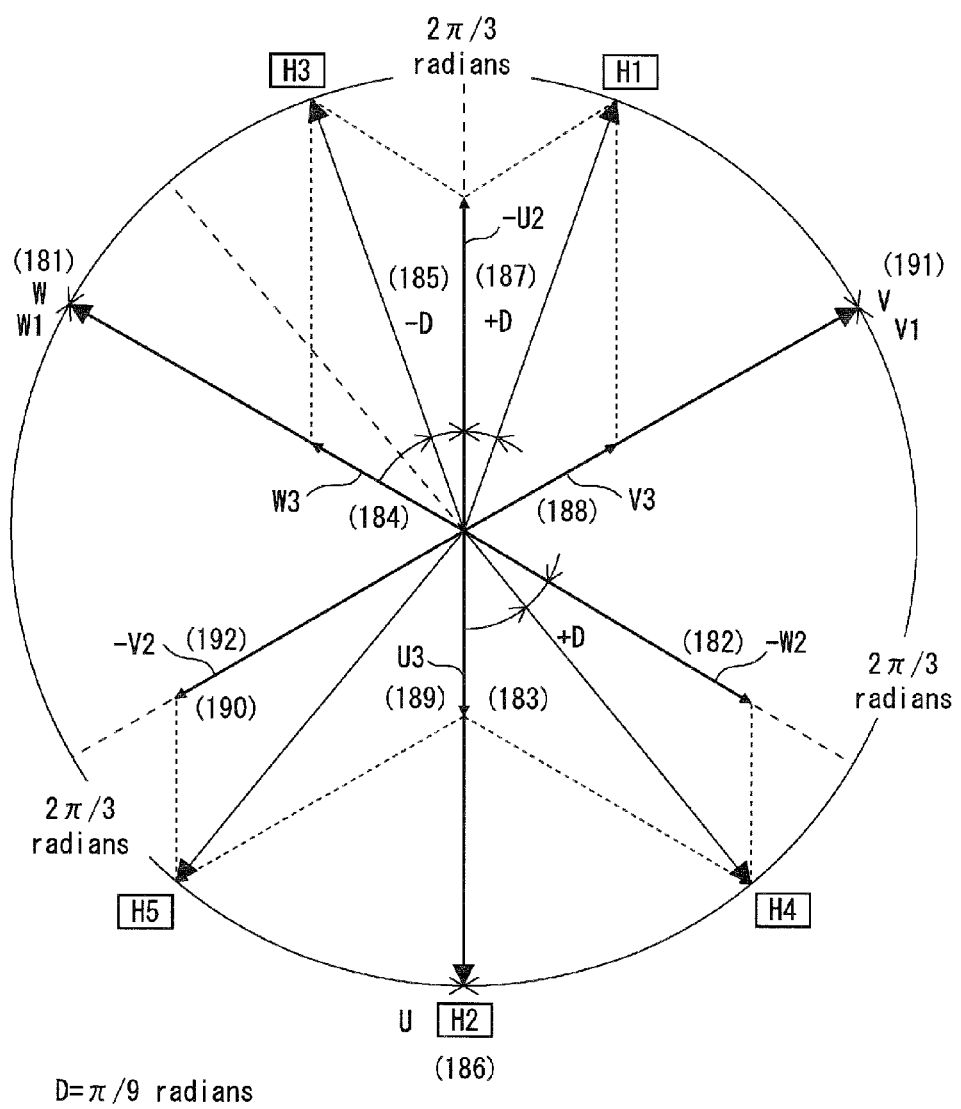
FIG. 9 is a vector diagram showing the magnitudes and phases of magnetic fields according to Embodiment 3.

FIG. 7 is a plan view of a synchronous motor according to the present Embodiment, FIG. 8 is a structural diagram of the coils in the synchronous motor, and FIG. 9 is a vector diagram showing the magnitudes and phases of magnetic fields.

A synchronous motor 51 includes a rotor 2 and a stator 13.

The rotor 2 is the same as in Embodiment 1, and apart from the configuration of the stator coils, the stator 13 is also the same as in Embodiment 1.

In FIG. 8, a U-phase coil 186 is wound in the positive direction in correspondence with the stator tooth 7a.

A U-phase coil 187 is wound in the negative direction around the stator yoke section to the right of the stator tooth 7ab. A U-phase coil 185 is wound in the negative direction around the stator yoke section to the right of the stator tooth 7ac. Furthermore, a U-phase coil 189 is wound in the positive direction around the stator yoke section to the right of the stator tooth 7ba. A U-phase coil 183 is wound in the positive direction around the stator yoke section to the right of the stator tooth 7ca.

Among the U-phase coils, only one type of coil is wound around the stator yoke section at the coil 186, whereas at the other coils, different types of coils are wound around the same stator yoke section.

Similarly, with regards to the V-phase coils 188, 190, 191, 192, and 194, the V-phase coils 188, 191, and 194 are wound around stator yoke sections in the positive direction, and the V-phase coils 190 and 192 are wound around stator yoke sections in the negative direction. Among the V-phase coils as well, only one type of coil is wound around the stator yoke section at the coil 191, whereas at the other coils, different types of coils are wound around the same stator yoke section.

Similarly, with regards to the W-phase coils 177, 179, 181, 182, and 184, the W-phase coils 177, 181, and 184 are wound around stator yoke sections in the positive direction, and the W-phase coils 179 and 182 are wound around stator yoke sections in the negative direction. Among the W-phase coils as well, only one type of coil is wound around the stator yoke section at the coil 181, whereas at the other coils, different types of coils are wound around the same stator yoke section.

For example, as shown in FIG. 7, the W-phase coil 182 and the U-phase coil 183 are wound around the same stator yoke section, as are the W-phase coil 184 and the U-phase coil 185. The U-phase coil 186 is wound alone around a stator yoke section. The U-phase coil 187 and the V-phase coil 188 are wound around the same stator yoke section, as are the U-phase coil 189 and the V-phase coil 190.

3.2 Magnetic Fields Produced

The following describes the magnetic fields produced at the stator teeth by the above-described coil structure. To clearly illustrate the positional relationship between the stator teeth and the rotor magnetic poles, the following explanation focuses on the relationship between the points between rotor magnetic poles and the center of the stator teeth located to the left of the stator yoke sections. The rotor is assumed to rotate counter-clockwise.

In FIG. 7, the stator tooth 7a corresponding to the U-phase coil 186 opposes the point between rotor magnetic poles. In this position, the stator tooth 7a yields the maximum torque, and the magnetic field produced by the U-phase coil 186 at this time is shown as H2 in FIG. 9.

The stator tooth 7ab to the left of the stator yoke section around which the U-phase coil 187 and the V-phase coil 188 are wound is $\pi$ radians $+\pi/9$ radians ahead of the magnetic pole opposing the stator tooth 7a. In FIG. 9, the vector H1, a composite of the vectors indicating the magnetic field –U2 by the U-phase coil 187 and the magnetic field V3 by the V-phase coil 188, is represented as a vector indicating the magnetic field produced at the stator tooth 7ab which is $\pi$ radians $+\pi/9$ radians ahead of the U-phase.

Similarly, the stator tooth 7ac to the left of the stator yoke section around which the U-phase coil 185 and the W-phase coil 184 are wound is $\pi$ radians $+\pi/9$ radians behind the magnetic pole opposing the stator tooth 7a. This is equivalent, in terms of phase relationship, to being $\pi$ radians $-\pi/9$ radians ahead. In FIG. 9, the vector H3, a composite of the vectors indicating the magnetic field W3 by the W-phase coil 184 and the magnetic field –U2 by the U-phase coil 185, is represented as a vector indicating the magnetic field produced at the stator tooth 7ac which is $\pi$ radians $-\pi/9$ radians behind the U-phase. Magnetic fields produced by coils wound around the other stator yoke sections (such as H4, H5, and the like) are similar. As represented by these vectors, by adjusting the number of turns and the winding direction, the current phase can be controlled to a phase in which torque is at a maximum, thus yielding a high-torque, low-vibration synchronous motor.

3.3 Comparison of Torque

Figure 10:
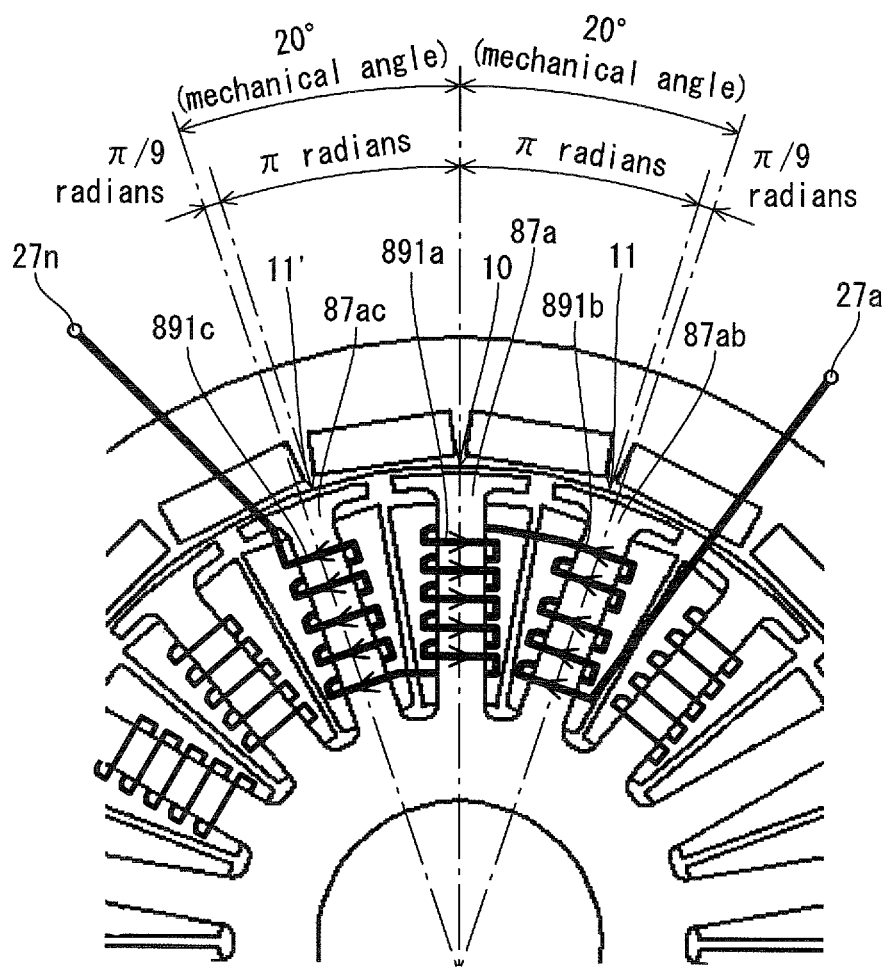
FIG. 10 shows details on a conventional synchronous motor.

The following compares the torque obtained by the synchronous motor of the present Embodiment and the torque obtained by a conventional synchronous motor. FIG. 10 shows details on a conventional synchronous motor. The structure of the coils differs in the conventional synchronous motor from the synchronous motor of the present Embodiment. As shown in FIG. 10, coils 891a, 891b, and 891c are respectively wound around stator teeth 87a, 87ab, and 87ac. These coils are connected in series, with one end 27a of the coils connected to a U-phase input terminal, and the other end 27n connected to a neutral point. Since only U-phase coils are connected to the stator teeth, the magnetic field produced at each stator tooth has the same phase. That is, supposing that a magnetic field at maximum magnitude is produced at the stator tooth 87a when the axis of the stator tooth 87a and the point 10 between the rotor magnetic poles coincide, then a magnetic field at maximum magnitude will be produced at the stator tooth 87ab when the axis of the stator tooth 87ab and the point 11 between the rotor magnetic poles are misaligned, and a magnetic field at maximum magnitude will similarly be produced at the stator tooth 87ac when the axis of the stator tooth 87ac and the point 11' between the rotor magnetic poles are misaligned. For this reason, while the magnetic torque produced at the stator tooth 87a is maximized, the magnetic torque produced by the stator teeth 87ab and 87ac is not maximized. Accordingly, in comparison with the present Embodiment, the total torque is lower, and torque ripple is greater.

Figure 11:
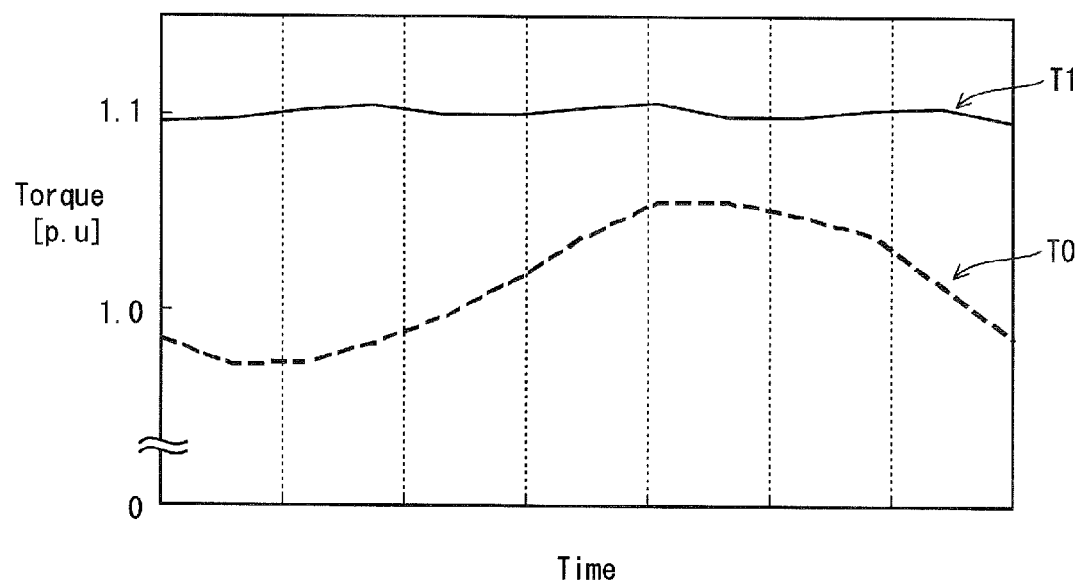
FIG. 11 shows change over time in torque.

FIG. 11 shows change over time in torque.

The torque waveform that is obtained from the synchronous motor of the present Embodiment is shown as T1, and the torque waveform that is obtained from a conventional synchronous motor is shown as T0. The magnitude of the torque for the present Embodiment is 105% greater than that of the conventional synchronous motor. Also, the torque ripple relative to average torque, expressed as a torque ripple ratio, is 0.5% in the present Embodiment, presenting a great reduction from the conventional 5.3%. According to the present Embodiment, enhanced torque coexists with reduced torque ripple, whereas conventionally, a tradeoff was thought to exist between the two.

4. Embodiment 4

The synchronous motor in the present Embodiment differs from Embodiment 1 by having 10q poles and 12q teeth (q being a positive integer).

4.1 Structure

Figure 12:
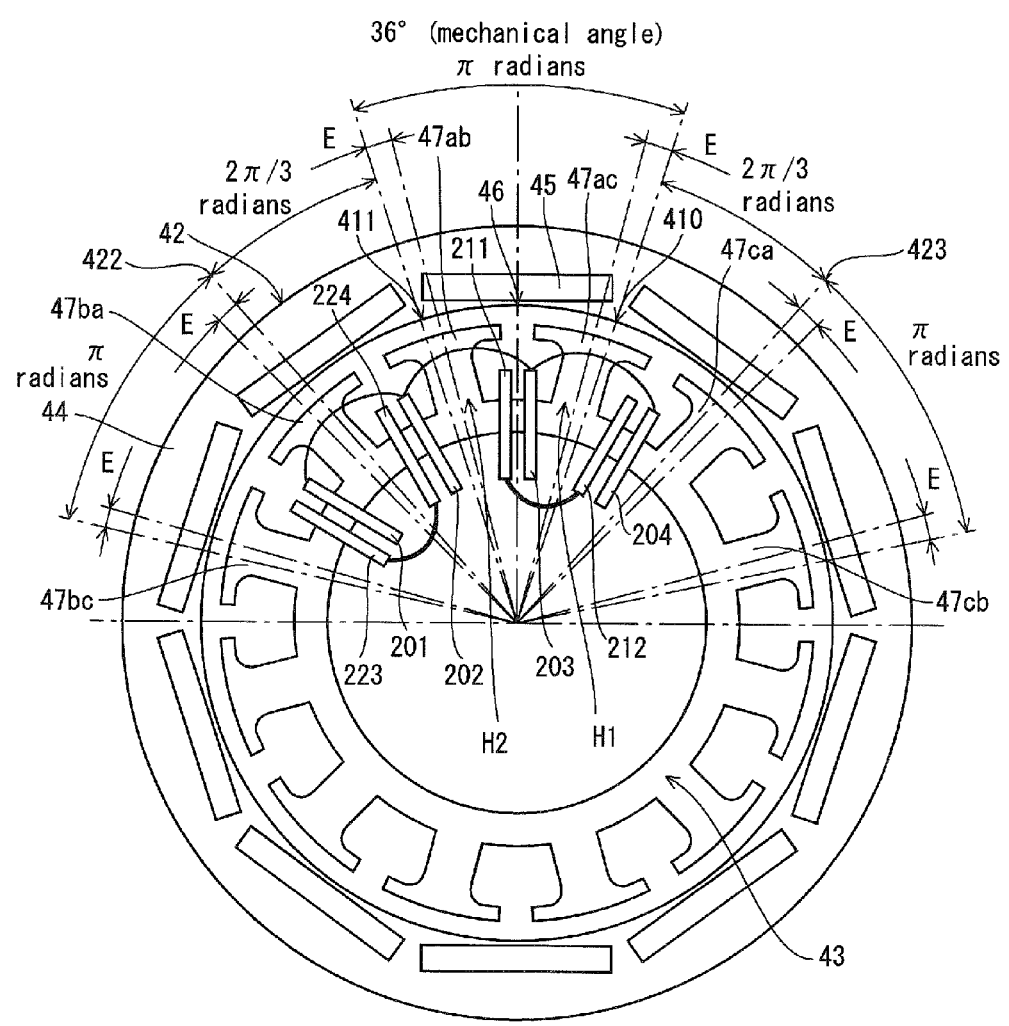
FIG. 12 is a plan view of a synchronous motor according to Embodiment 4.
Figure 13:
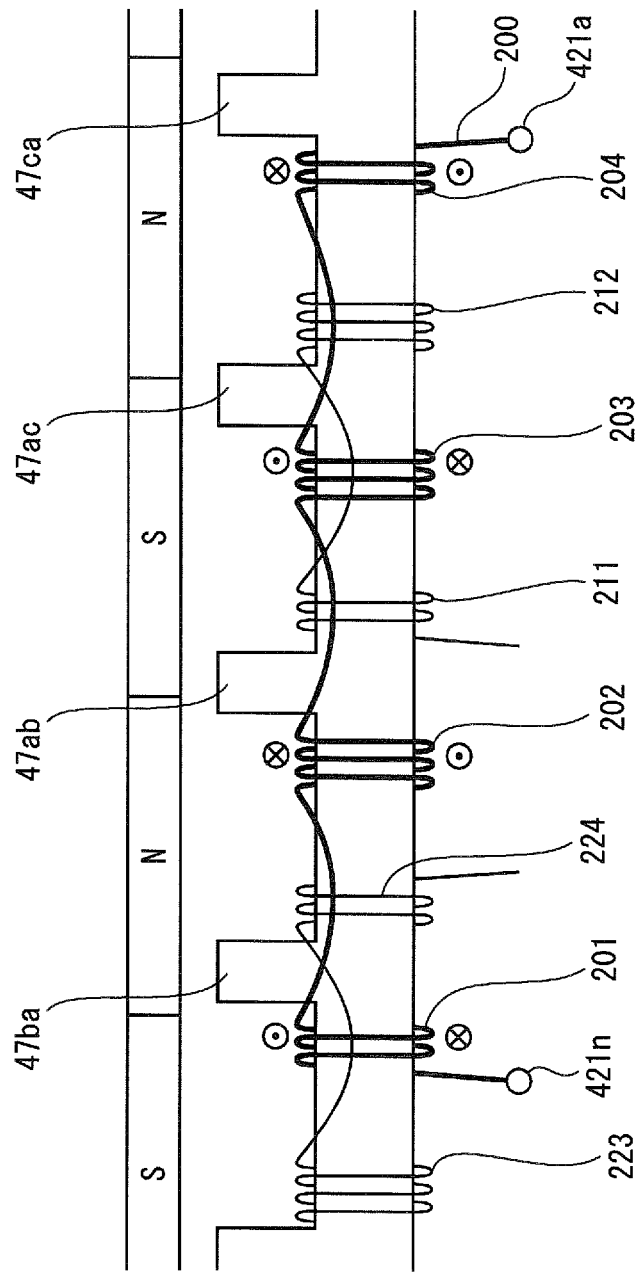
FIG. 13 is a schematic diagram of the coil structure of the synchronous motor according to Embodiment 4.

FIG. 12 is a plan view of a synchronous motor according to the present Embodiment. FIG. 13 is a schematic diagram of the coil structure of the synchronous motor according to the present Embodiment.

A synchronous motor 41 includes a rotor 42 and a stator 43.

The rotor 42 includes a rotor core 44 and ten permanent magnets 45. The permanent magnets 45 are arranged on the rotor core 44 at equal intervals along the circumferential direction of the rotor 42. The permanent magnets 45 form magnetic poles 46 composed of pairs of N and S poles. The N poles and the S poles are alternately arranged around the stator 43. A pair of north and south magnetic poles forms an electrical angle of $2\pi$ radians. The interval between two adjacent magnetic poles is $\pi$ radians in terms of electrical angle. In the present Embodiment, the rotor has 10 magnetic poles. Thus, the electrical angle is five times the mechanical angle. Since the number of magnetic poles is 10 and the number of stator teeth is 12, the stator teeth 47 are provided circularly at a ⅚ offset per semi-circle. Note that the stator teeth 47 are a collective name for stator teeth that include representations in the form "stator tooth 47 +suffix", such as stator tooth 47ab, 47ac, 47ca, 47ba, 47cb, 47bc, and the like. Each of the points 410 and 411 between the magnetic poles of the rotor is a magnetic neutral point between an N magnetic pole and an S magnetic pole each generated with a permanent magnet located in the rotor. Here, it is assumed that each neutral point is located between the magnets, in terms of the physical locations as well. The point 411 shows the magnetic neutral point at which the magnetic property changes from N to S in the counter-clockwise direction, and the point 410 shows the magnetic neutral point at which the magnetic property changes from S to N in the counter-clockwise direction.

The stator 43 includes a plurality of stator teeth 47 facing the rotor 42. The stator 43 also includes main coils and sub-coils wound by concentrated winding around stator yoke sections sandwiching the stator teeth 47.

Taking the counter-clockwise rotation direction to be positive, when the stator tooth 47ac is provided at a position π/12 radians ahead of a point 410 between the rotor magnetic poles in terms of electrical angle, the stator tooth 47ab is provided at a position π/12 radians behind a point 411 between the rotor magnetic poles in terms of electrical angle.

The stator tooth 47ba is provided, in terms of electrical angle, at a position π/12 radians further ahead of a position 422 which in turn is ⅔π radians ahead of the point 411 between the rotor magnetic poles, and the stator tooth 47bc is provided at a position π/12 radians behind a position that is offset from the position 422 by π radians in terms of electrical angle.

The stator tooth 47ca is provided, in terms of electrical angle, at a position π/12 radians further behind a position 423 which in turn is ⅔π radians behind the point 410 between the rotor magnetic poles, and the stator tooth 47cb is provided at a position π/12 radians ahead of a position that is offset from the position 423 by π radians in terms of electrical angle.

Accordingly, the stator teeth 47ba, 47bc, 47cb, and 47ca are provided at equal intervals of 2π/3 radians in terms of electrical angle with respect to the stator tooth 47ac and the stator tooth 47ab.

4.2 Structure of Stator Teeth Groups

The following describes the structure of stator teeth groups. The 12 stator teeth 47 form stator teeth groups aligned circumferentially, each group containing two stator teeth. Within one stator teeth group, reference stator teeth that indicate the phase relationship with the rotor have the largest number of turns in the main coils. For example, focusing on the stator teeth group formed by the stator teeth 47ab and 47ac, the reference stator teeth are the stator teeth 47ab and 47ac. As shown in FIG. 12, the stator tooth 47ac and the stator tooth 47ab are provided offset from the inter-polar gap of π radians by π/12 radians.

4.3 Structure of Stator Coils

The following describes the structure of the stator coils.

FIG. 13 is a conceptual diagram of the structure of the stator coils wound around the stator teeth.

As shown in FIG. 13, a U-phase coil 200 includes U-phase coils 201, 202, 203, and 204 connected in series. An end 421a of the U-phase coil 200 is connected to a U-phase input terminal, and an end 421n of the U-phase coil 200 is connected to a neutral point.

A U-phase coil 201 is wound in the positive direction. A U-phase coil 203 is wound in the positive direction, and U-phase coils 202 and 204 are wound in the negative direction.

As for the W-phase coils in FIG. 13, a W-phase coil 223 is wound in the positive direction around the stator yoke section around which the U-phase coil 201 is wound, and a W-phase coil 224 is wound in the negative direction around the stator yoke section around which the U-phase coil 202 is wound.

As for the V-phase coils in FIG. 13, a V-phase coil 211 is wound in the positive direction around the stator yoke section around which the U-phase coil 203 is wound, and a V-phase coil 212 is wound in the negative direction around the stator yoke section around which the U-phase coil 203 is wound.

4.4 Magnetic Fields Produced at Stator Teeth

Next, the magnetic fields produced at these stator teeth are described. Note that the rotor is assumed to rotate counter-clockwise.

Figure 14:
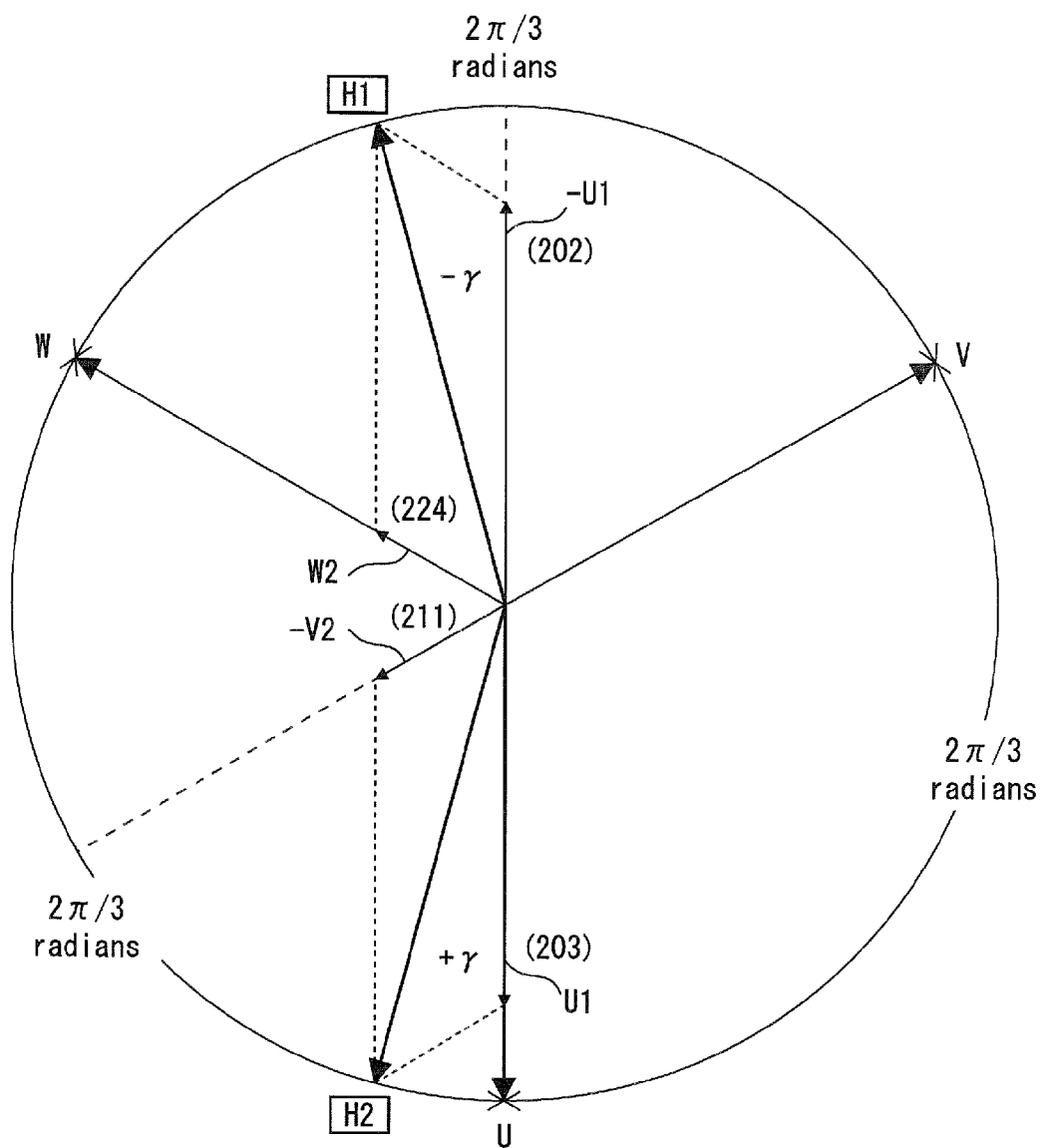
FIG. 14 is a vector diagram representing the magnitudes and phases of magnetic fields according to Embodiment 4 as vectors.

FIG. 14 is a vector diagram representing the magnitudes and phases of magnetic fields as vectors.

To clearly illustrate the positional relationship between the stator teeth and the rotor magnetic poles, the following explanation focuses on the relationship between the center of the stator teeth located to the right of the stator yoke sections around which the coils are wound and the points between rotor magnetic poles. The coils wound around the stator yoke sections are assumed to produce the magnetic fields at the stator teeth to the right of the coils.

In the positional relationships in FIG. 12, the center of the stator tooth 47ab to the right of the stator yoke section around which are wound the U-phase coil 202 and the W-phase coil 224 is provided at a location π/12 radians behind the inter-polar gap 411. In FIG. 14, the magnetic field produced at the stator tooth 47ab is indicated as a vector H1, which is a composite of the vectors indicating the magnetic field −U1 by the U-phase coil 202 and the magnetic field W2 by the W-phase coil 224.

Similarly, in FIG. 12, the center of the stator tooth 47ac to the right of the stator yoke section around which are wound the U-phase coil 203 and the V-phase coil 211 is provided at a location π/12 radians ahead of the inter-polar gap 410. In FIG. 14, the magnetic field produced at the stator tooth 47ac is indicated as a vector H1, which is a composite of the vectors indicating the magnetic field U1 by the U-phase coil 203 and the magnetic field −V2 by the V-phase coil 211.

Forming magnetic fields in this way to be appropriate for the positional relationships between the rotor and the stator yields high torque, reduces torque ripple, and achieves smooth driving.

The following describes an example of the number of turns in the coils that produce the magnetic fields represented by the vector diagram. Assume that the number of magnetic poles is 10, the number of teeth is 12, two out of three types of coils are provided at 2π/3 radian intervals in terms of electrical angle and are concentrically wound by concentrated winding around an annular yoke section between adjacent teeth, the number of pairs of magnetic poles is five, the number of teeth per phase is four, and 4=3m+1. A coil coefficient α can then be calculated according to the equations below.

$$\alpha = |2\pi/A - 2\pi/B| \times P/2$$
$$= |2\pi/10 - 2\pi/12| \times 5/2$$
$$= \pi/12 \text{ radians}$$

Letting the number of turns in the U-phase coil 202 corresponding to the stator tooth 47ab be N112, the number of turns in the V-phase coil 224 corresponding to the stator tooth 47ab be N212, and the sum of these numbers of turns be N1, the following equations hold.

$$N1 = N112 + N212$$
$$N112 \approx (N1) \times \sin(\pi/12)/\sin(\pi/3)$$
$$N212 \approx (N1) \times \sin(\pi/3 - \pi/12)/\sin(\pi/3)$$
$$\approx (N1) \times \sin(\pi/4)/\sin(\pi/3)$$

By thus adjusting the number of turns in each coil, the magnetic field H2 produced at the stator tooth 47ab has a phase that is π/12 radians ahead of the U-phase in terms of electrical angle.

Letting the number of turns in the U-phase coil 203 corresponding to the stator tooth 47ac be N113, the number of turns in the W-phase coil 211 corresponding to the stator tooth 47ac be N313, and the sum of these numbers of turns be N1, the following equations hold.

$$N1 = N113 + N313$$
$$N113 \approx (N1) \times \sin(\pi/12)/\sin(\pi/3)$$
$$N313 \approx (N1) \times \sin(\pi/3 - \pi/12)/\sin(\pi/3)$$
$$\approx (N1) \times \sin(\pi/4)/\sin(\pi/3)$$

By adjusting the number of turns in each coil, the magnetic field H1 produced at the stator tooth 47ac has a phase that is π/12 radians behind the –U-phase in terms of electrical angle.

In FIG. 12, the stator tooth 47ac is located at a position π/12 radians ahead of the point 410 between the rotor magnetic poles in terms of electrical angle. Given this positional relationship for the stator tooth 47ac, the magnetic field H1 is produced π/12 radians behind the –U phase, and thus when the axis of the stator tooth 47ac and the point 410 between the rotor magnetic poles coincide, a magnetic field at maximum magnitude is produced at the stator tooth 47ac.

In FIG. 12, the stator tooth 47ab is located at a position π/12 radians behind the point 411 between the rotor magnetic poles in terms of electrical angle. Given this positional relationship for the stator tooth 47ab, the magnetic field H2 is produced π/12 radians ahead of the U phase, and thus when the axis of the stator tooth 47ab and the point 411 between the rotor magnetic poles coincide, a magnetic field at maximum magnitude is produced at the stator tooth 47ab.

As shown, in the present Embodiment, when the axes of the stator teeth and the points between the rotor magnetic poles coincide, the stator teeth-produced magnetic fields are at maximum magnitude, and so the magnetic torque produced by each of the stator teeth is also maximized, which in turn increases the total torque. Also, the torque produced by each of the stator teeth is nearly uniform, which reduces torque ripple.

The present embodiment adopts a structure with 10q poles and 12q teeth (q being a positive integer), and thus the same effects can be obtained with 20 poles and 24 teeth. With 10q poles and 12q teeth, the U-phase, V-phase, and W-phase are symmetric about the axis. Therefore, the resultant attractive force in the radial direction due to stator teeth whose coils are energized is zero, and no magnetic attractive force operates on the rotor. Accordingly, no adverse effect upon the lifespan of the axis is produced, thereby achieving a synchronous motor with a long lifespan. Similarly, with 24 poles and 27 teeth, four coils that are wound around adjacent teeth connected to a neutral point are provided every 90° in terms of mechanical angle with respect to the axis. Therefore, the resultant attractive force in the radial direction due to stator teeth whose coils are energized is zero, and no magnetic attractive force operates on the rotor.

5. Embodiment 5

The differences with Embodiment 1 are the coils and the provided current. The following description focuses on these differences. In Embodiment 1, one three-phase alternating current power source is used for driving in three-phases, the U-phase, the V-phase, and the W-phase. In Embodiment 5, on the other hand, three different three-phase alternating current power sources are used for driving in nine phases: a U1 phase, a U2 phase, a U3 phase, a V1 phase, a V2 phase, a V3 phase, a W1 phase, a W2 phase, and a W3 phase.

FIG. 1, the same figure for Embodiment 1, shows a plan view of the synchronous motor of the present Embodiment.

Figure 15:
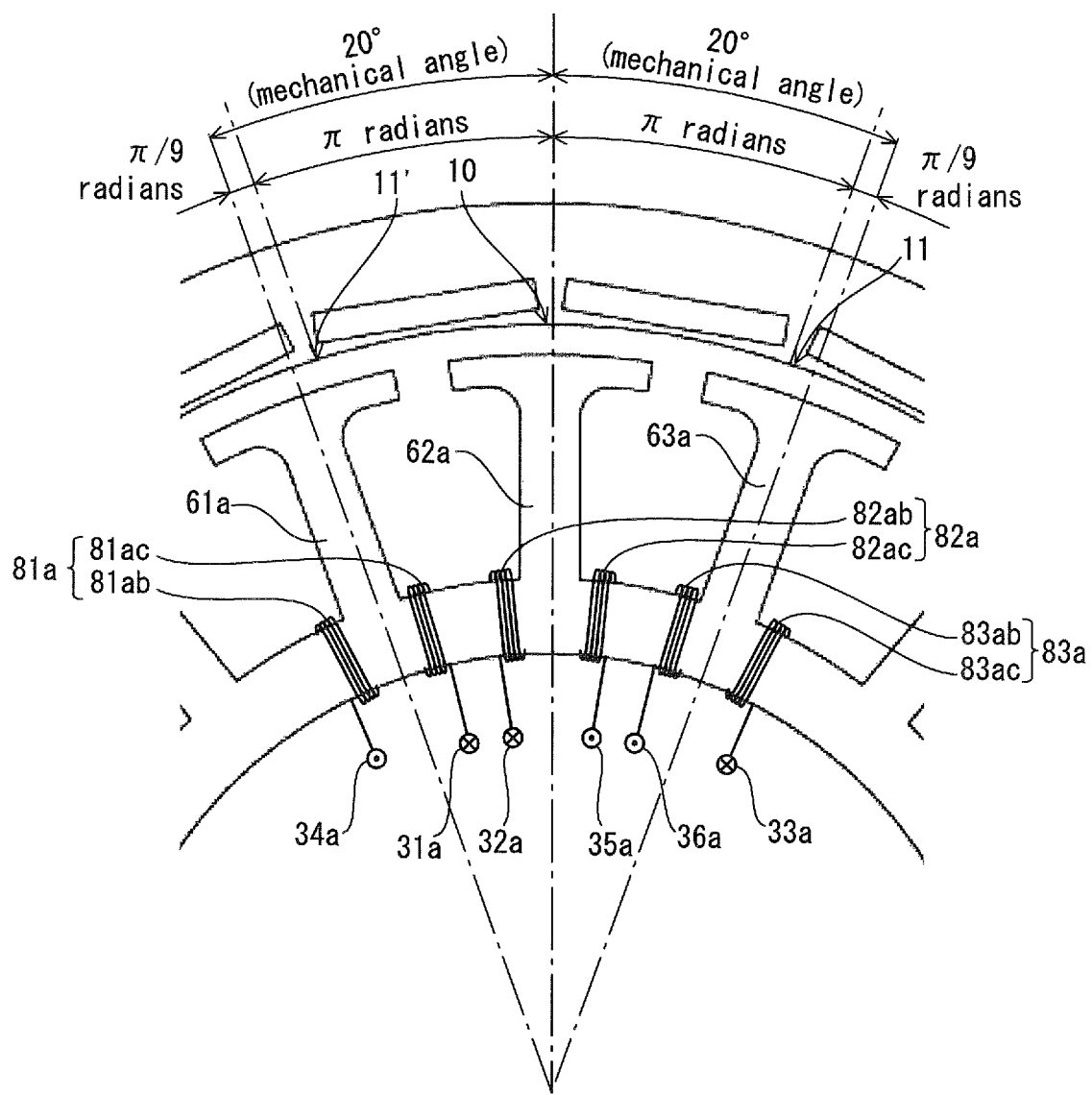
FIG. 15 shows details on a synchronous motor according to Embodiment 5.

FIG. 15 shows details on the synchronous motor.

The stator teeth group 8a is composed of three adjacent stator teeth 61a, 62a and 63a. A stator coil 81ab is wound around the stator yoke section to the left of the stator tooth 61 in the negative direction, and a stator coil 81ac is wound around the stator yoke section to the right in the positive direction. The stator coil 81ab and the stator coil 81ac are connected in series and form a U1 phase coil 81a in which current of the U1 phase flows. A stator coil 82ab is wound around the stator yoke section to the left of the stator tooth 62a in the negative direction, and a stator coil 82ac is wound around the stator yoke section to the right in the positive direction. The stator coil 82ab and the stator coil 82ac are connected in series and form a U2 phase coil 82a in which current of the U2 phase flows. A stator coil 83ab is wound around the stator yoke section to the left of the stator tooth 63a in the negative direction, and a stator coil 83ac is wound around the stator yoke section to the right in the positive direction. The stator coil 83ab and the stator coil 83ac are connected in series and form a U3 phase coil 83a in which current of the U3 phase flows.

The stator tooth 61a is positioned with an offset of +20° in terms of mechanical angle with respect to the stator tooth 62a. That is, the stator tooth 61a is arranged with an additional offset of +π/9 radians besides the offset of π radians in electrical angle (i.e. 18° in mechanical angle) between the magnetic poles. Similarly, the stator tooth 63a is positioned with an offset of −20° in terms of mechanical angle with respect to the stator tooth 62a. That is, the stator tooth 63a is arranged with an additional offset of −π/9 radians besides the offset of π radians in electrical angle between the magnetic poles. Note that the stator teeth are arranged in the rotation direction at equal intervals of 360/18=20°. On the other hand, twenty magnetic poles of the rotor are distributed in the rotation direction at equal intervals of 360/20=18°. This also applies to the other two stator teeth groups 8b and 8c shown in FIG. 1. That is, similarly to the stator teeth group 8a, three coils of each stator teeth group are arranged with an additional offset of +π/9 radians or −π/9 radians in electrical angle besides the offset of π radians in electrical angle, which is the interval between the magnetic poles.

Figure 16:
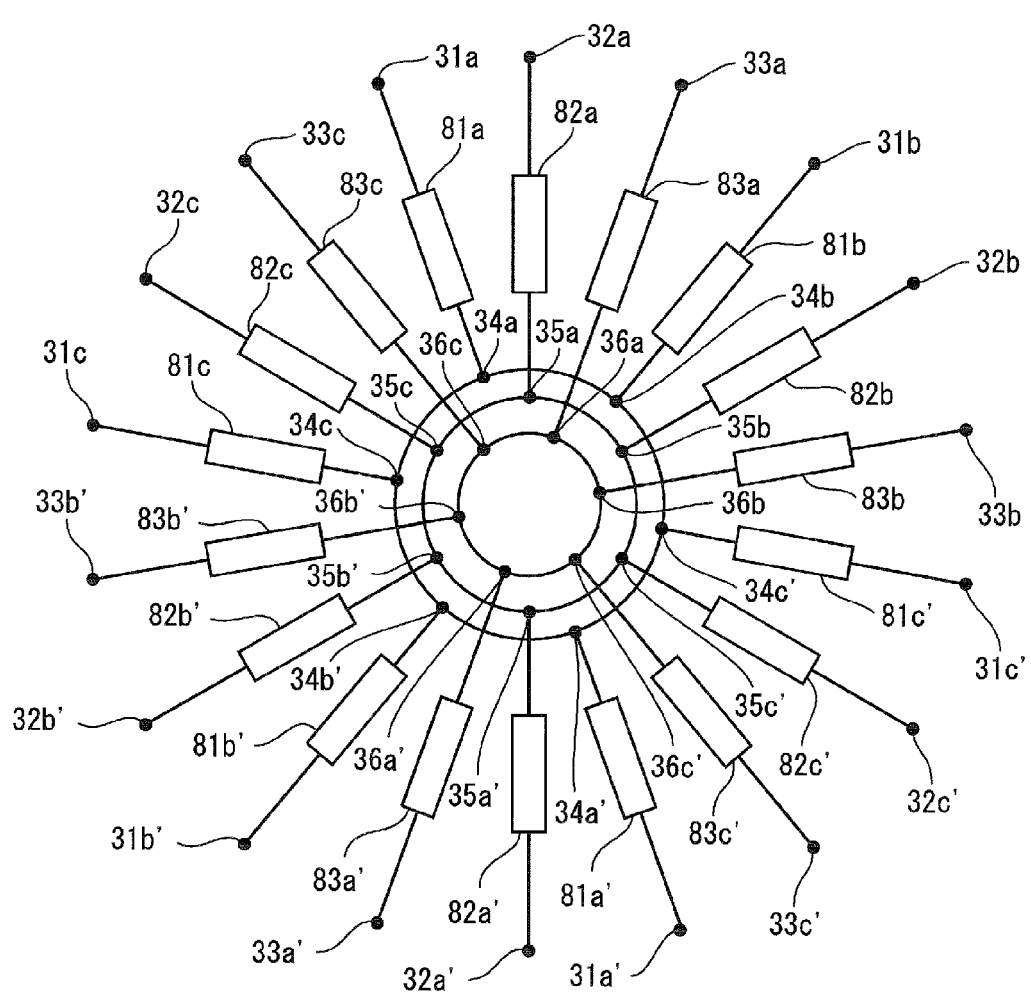
FIG. 16 illustrates the connections of stator coils in the synchronous motor according to Embodiment 5.

FIG. 16 is a drawing for explaining connections of the stator coils in the synchronous motor in FIG. 1.

The suffixes "a", "b", and "c" at the ends of the coil terminal numbers correspond to the coils contained in the stator teeth groups 8a, 8b and 8c, respectively.

The coil terminals 31a, 32a, and 33a respectively of the three stator coils 81a, 82a, and 83a in the stator teeth group 8a each extend to the outside and are individually connected to connection terminals of an inverter, which is an actuator device. Similarly, three coil terminals 31b, 32b, and 33b belonging to the stator teeth group 8b and three coil terminals 31c, 32c, and 33c belonging to the stator teeth group 8c each extend to the outside and are individually connected to connection terminals of the inverter, i.e. the actuator device.

Additionally, among the stator coil terminals in different stator teeth groups 8a, 8b, and 8c, coil terminals having a phrase difference of 2π/3 radians are connected to a common neutral point. That is, the stator coil terminals 34a, 34b, and 34c are connected to a first neutral point, the stator coil terminals 35a, 35b, and 35c are connected to a second neutral point, and the stator coil terminals 36a, 36b, and 36c are connected to a third neutral point. In this example, the first, the second, and the third neutral points are electrically disconnected. However, any two or all of the neutral points may be electrically connected with each other.

The present embodiment includes two pairs of stator teeth groups 8a, two pairs of stator teeth groups 8b, and two pairs of stator teeth groups 8c. Stator teeth groups with the same suffix (i.e. a, b, or c) have the same positional relationship (i.e. the same electrical angle) with respect to the magnetic poles of the rotor. Thus, three adjacent pairs of the six pairs of stator teeth groups may connect to a single neutral point, or three alternately-arranged pairs of the six pairs of stator teeth groups may connect to a single neutral point. Alternatively, all the six pairs of stator teeth groups may connect to a single neutral point.

This concludes the description of the structure of the synchronous motor included in the synchronous motor driving system pertaining to Embodiment 1 of the present invention. The eighteen stator teeth are arranged with intervals that are different from the intervals of the magnetic poles of the rotor. Every three stator teeth constitutes a stator teeth group. Three stator coils in each stator teeth group are separately connected to individual external terminals.

Here, note that the term "separately" refers to the relationship among the stator coils contained in a single stator teeth group, and not to the relationship among the stator coils contained in different stator teeth groups. Thus, stator coils contained in different stator teeth groups may be connected to the same external terminal, if conditions permit. For example, the stator coil 81a contained in the stator teeth group 8a and the stator coil 81a' contained in the stator teeth group 8a' may be connected to the same external terminal, because current of the same phase is supplied thereto. Of course, they may be connected to different external terminals separately.

The synchronous motor driving system according to Embodiment 1 of the present invention includes a drive apparatus for supplying currents in different phases to a plurality of coil terminals of the synchronous motor. The following explains the drive apparatus and methods of applying power.

Figure 17A:
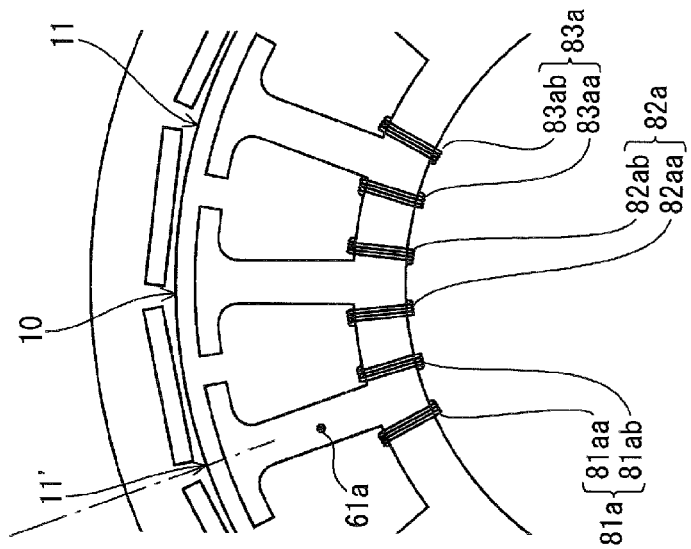
FIGS. 17A, 17B, and 17C show positional relationships between a rotor and a stator in Embodiment 5.
Figure 17B:
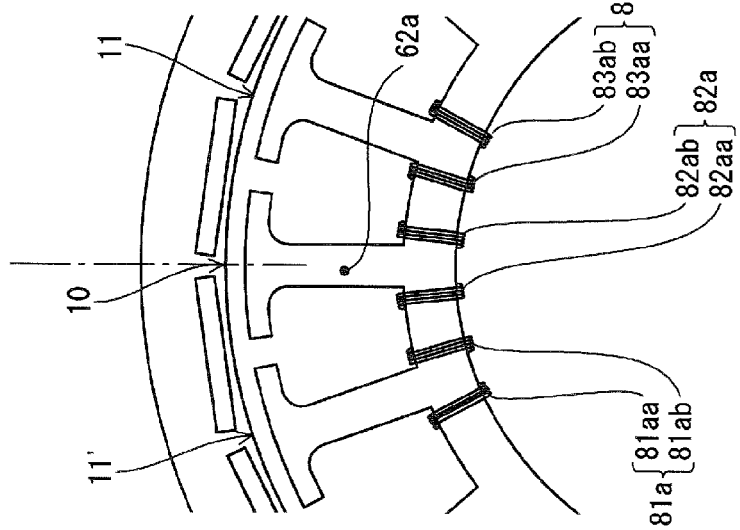
Figure 17C:
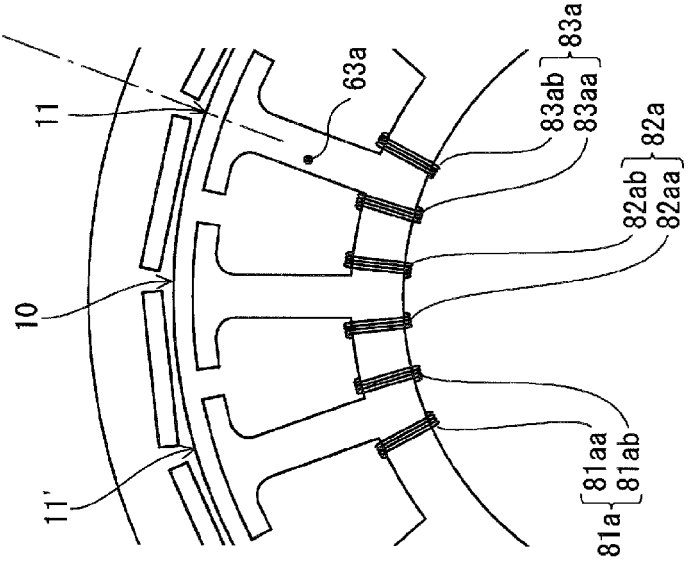
Figure 18:
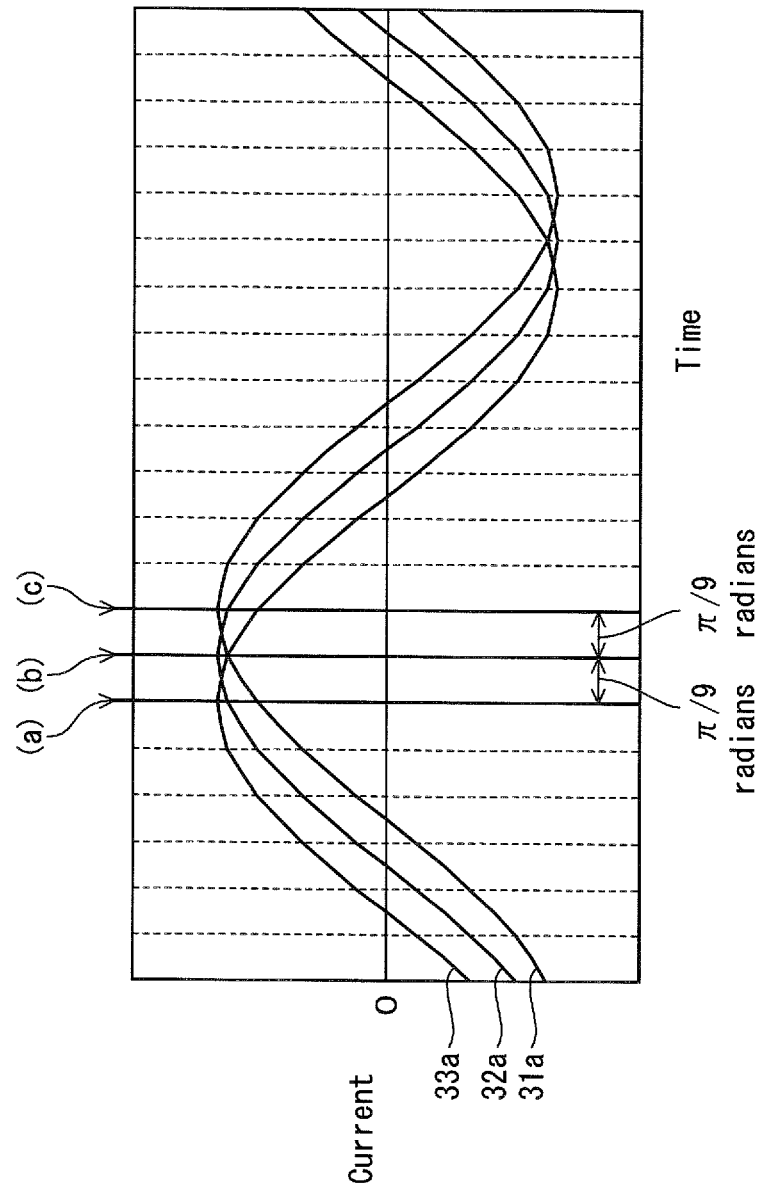
FIG. 18 shows the change over time in current flowing to each of the stator coils in Embodiment 5.

FIGS. 17A-17C show positional relationships between the stator and the rotor of Embodiment 1 of the present invention. FIGS. 17A-17C show the positional relationship in the case where the rotor is rotated counter-clockwise by 2° in mechanical angle (i.e. π/9 radians in electrical angle) at a time. FIG. 18 shows change over time of the currents applied to the stator coils according to the present Embodiment. The time points (a), (b) and (c) in FIG. 18 correspond to the positional relationships shown in FIG. 17A, FIG. 17B and FIG. 17C, respectively.

In FIG. 1 and FIGS. 17A-17C, points between magnetic poles of the rotor are indicated by the signs 10 and 11. Each of the points 10 and 11 between the magnetic poles of the rotor is a magnetic neutral point between an N magnetic pole and an S magnetic pole each generated with a permanent magnet located in the rotor. Here, it is assumed that each neutral point is located between the magnets, in terms of the physical locations as well. The point 10 shows the magnetic neutral point at which the magnetic property changes from N to S counter-clockwise, and the point 11 shows the magnetic neutral point at which the magnetic property changes from S to N counter-clockwise. Note that the point 11' is at the same position as the point 11 in terms of electrical angle, but at a different position in terms of mechanical angle.

In FIG. 17A, as shown by the alternating long and short dashed line, the center point of the stator tooth 63a and the point 11 between the rotor magnetic poles are in line. If this is the case, the torque due to the permanent magnets reaches its maximum when the phase of the current supplied is controlled such that the current that flows through the U3 phase coil 83a is controlled so as to be maximized. As explained with reference to FIG. 15, the angle between adjacent magnetic poles)(18°) and the angle between adjacent stator teeth) (20°) are different. Thus, when the center point of the stator tooth 63a and the point 11 between the rotor magnetic poles are in line, the center point of the stator tooth 62a and the point 10 between the rotor magnetic poles, as well as the center point of the stator tooth 61a and the point 11' between the rotor magnetic poles, are not in line.

In FIG. 17B, the rotor is rotated counter-clockwise from that shown in FIG. 17A by 2° in terms of mechanical angle (i.e. π/9 radians in terms of electrical angle). As shown by the alternating long and short dashed line, the center point of the stator tooth 62a and the point 10 between the rotor magnetic poles are in line. If this is the case, the torque due to the permanent magnets reaches its maximum when the phase of the current supplied is controlled such that the current that flows through the U2 phase coil 82a is controlled so as to be maximized. In this case, the center point of the stator tooth 63a and the point 11 between the rotor magnetic poles, and the center point of the stator tooth 61a and the point 11' between the rotor magnetic poles, are not in line.

In FIG. 17C, the rotor is rotated counter-clockwise from that shown in FIG. 17B by 2° in terms of mechanical angle (i.e. π/9 radians in terms of electrical angle). As shown by the alternating long and short dashed line, the center point of the stator tooth 61a and the point 11' between the rotor magnetic poles are in line. If this is the case, the torque due to the permanent magnets reaches its maximum when the phase of the current supplied is controlled such that the current that flows through the U1 phase coil 81a is controlled so as to be maximized. In this case, the center point of the stator tooth 63a and the point 11 between the rotor magnetic poles, and the center point of the stator tooth 62a and the point 10 between the rotor magnetic poles, are not in line.

The phase of the current to be applied is controlled such that the currents flowing through the U1 phase coil 81a, the U2 phase coil 82a, and the U3 phase coil 83a are at their maximum when the positional relationships are as shown in FIGS. 17A, 17B and 17C, that is, when each of the respective center points of the stator teeth 61a, 62a and 63a is in line with a point between rotor magnetic poles. This maximizes the magnet torque for each of the stator teeth, thereby increasing the total torque.

In FIG. 18, the vertical axis shows the currents applied to the coil terminals 31a, 32a and 33a (i.e. to the U1 phase coil 81a, the U2 phase coil 82a, and the U3 phase coil 83a), and the horizontal axis shows time. As shown in FIG. 18, the current applied to the coil terminal 33a is set ahead of the current applied to the coil terminal 32a by π/9 radians, and the current applied to the coil terminal 31a is delayed from the current applied to the coil terminal 32a by π/9 radians.

The relationship between the positional relationships of the stator coils and the currents to be applied to the stator coils is as follows.

With respect to the U2 phase coil 82a, the U3 phase coil 83a is arranged with an additional offset of −π/9 radians from the offset of π radians in terms of electrical angle. In such a positional relationship, the current applied to the U2 phase coil 82a is set ahead of the current applied to the U3 phase coil 83a by π/9 radians. On the other hand, with respect to the U2 phase coil 82a, the U1 phase coil 81a is arranged with an additional offset of +π/9 radians from the offset of π radians in terms of electrical angle. In such a positional relationship, the current applied to the U2 phase coil 82a is set behind the current applied to the U1 phase coil 81a by π/9 radians.

Figure 19:
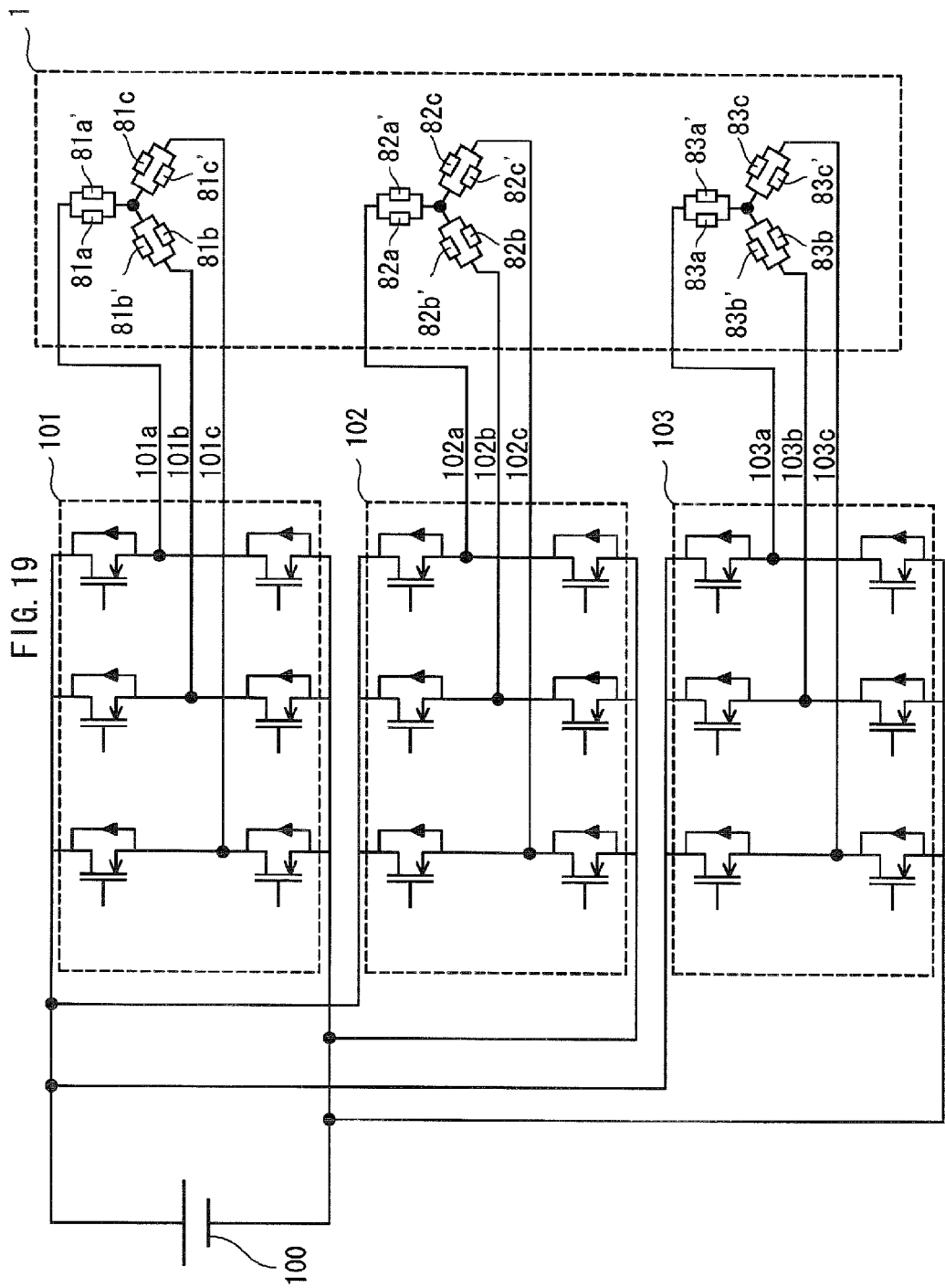
FIG. 19 shows the overall structure of a synchronous motor driving system according to Embodiment 5.

FIG. 19 shows an overall structure of a synchronous motor driving system pertaining to Embodiment 1 of the present invention.

The synchronous motor driving system includes a DC power source 100 and inverters 101, 102, and 103 serving as an actuator device, and a synchronous motor 1. The inverters 101, 102, and 103 generate three-phase alternating current and provide the current to the synchronous motor 1. Output currents 101a, 101b, and 101c from the inverter 101 are each shifted in phase by 2π/3 radians. The same is true for output currents 102a, 102b, and 102c from the inverter 102, and for output currents 103a, 103b, and 103c from the inverter 103. Output currents 101a, 102a, and 103a are each shifted in phase by π/9 radians. The same is true for output currents 101b, 102b, and 103b, and for output currents 101c, 102c, and 103c.

As shown in FIG. 15, the stator teeth are provided shifted by π/9 radians in terms of electrical angle. Therefore, the current supplied to the stator coils wound around these stator teeth is set to be shifted by π/9 radians. In other words, current is supplied as follows: the phase of the current applied to the U3 phase coil 83a is adjusted to be at a maximum with the positional relationship shown in FIG. 17A, the phase of the current applied to the U2 phase coil 82a is adjusted to be at a maximum with the positional relationship shown in FIG. 17B, and the phase of the current applied to the U1 phase coil 81a is adjusted to be at a maximum with the positional relationship shown in FIG. 17C. By doing so, the magnet torque yielded by each stator tooth is at the maximum, thereby increasing the total torque.

As explained above, in the synchronous motor of the present Embodiment, the intervals of the rotor magnetic poles are 18° in terms of mechanical angle (π radians in terms of electrical angle), whereas the intervals of the three stator teeth in each stator teeth group are 20° in terms of mechanical angle, instead of 18°. With such a mechanical phase difference, the synchronous motor reduces the cogging torque, i.e. torque ripple while no electrical power is being supplied.

In the synchronous motor of the present Embodiment, each of the stator teeth in each stator teeth group is located with a phase difference of π/9 radians with respect to π radians in terms of electrical angle, and current is supplied to the stator coils wound around the stator teeth such that the current flowing to each stator coil has a phase difference of π/9 radians. As a result, the torque yielded by each stator tooth is made equal, thus cancelling the torque ripple having a fundamental period of π/3 radians. Furthermore, the torque yielded by each stator tooth is maximized, thereby increasing the overall torque.

Note that in FIGS. 17A-17C and 18, only the magnet torque generated by the permanent magnets is taken into consideration. Thus, the phases of currents are adjusted so as to maximize the current flowing to a stator coil when the center point of the stator tooth and the point between magnetic poles of the rotor are in line. However, the synchronous motor of the present Embodiment is what is called an interior permanent magnet synchronous motor, which has permanent magnets arranged inside the rotor core. The synchronous motor utilizes reluctance torque resulting from a difference in magnetoresistance, along with the magnet torque generated by the magnets. In order to maximize the torque by utilizing both the magnet torque and the reluctance torque, it is in some cases effective to advance the phases of the currents so as not to maximize the current flowing to a stator coil when the center of the stator tooth and the point between magnetic poles of the rotor are aligned and facing each other.

In the present Embodiment, the stator coils are wound around the stator yoke section by concentrated winding. Such concentrated winding reduces the size of the coil at the ends of the stator, i.e. the coil ends, thus yielding a compact synchronous motor. The coil ends of the stator coils are sections that do not contribute to torque even when current flows therein, thus reducing copper loss, i.e. joules lost due to coil resistance when current is flowing, which is highly efficient.

Furthermore, in the present Embodiment, an outer rotor is used, i.e. the rotor is arranged at the outer perimeter of the stator. Therefore, the rotor diameter can be increased in comparison to other motors of the same volume, such as an inner rotor where the rotor is arranged at the inner perimeter of the stator. Accordingly, effective magnetic flux reduction can be prevented with no need to reduce the size of the permanent magnets, even in a synchronous motor that has 20 poles such as that of the present Embodiment.

In the synchronous motor of the present Embodiment, the number of rotor magnetic poles is 20 and the number of stator teeth is 18. However, the number of stator teeth may be 9, 27, or any other multiple of 9, and the number of rotor magnetic poles may be any multiple of 10, such that the combination is 10q poles to 9q teeth (q being a positive integer). This allows for the above-described positional relationships in terms of electrical angle, thus obtaining the same effects. The same effects may be obtained with 8q poles to 9q teeth, or with 10q poles to 12q teeth (q being a positive integer).

Furthermore, in the present Embodiment, the stator teeth groups 8a, 8b, and 8c, and the stator teeth groups 8a', 8b', and 8c', which are connected to neutral points, are symmetrically arranged around the axis. Therefore, the resultant attractive force in the radial direction due to stator teeth is zero, and no magnetic attractive force operates on the rotor. Accordingly, no adverse effect upon the lifespan of the axis is produced, thereby achieving a synchronous motor with a long lifespan. Similarly, with 30 poles and 27 teeth, three stator teeth groups connected to neutral points are provided every 120° in terms of mechanical angle with respect to the axis. Therefore, the resultant attractive force in the radial direction due to stator teeth whose coils are energized is zero, and no magnetic attractive force operates on the rotor.

In conclusion, with the structure of the present Embodiment, a reduction in torque is moderated while reducing torque ripple, thereby providing a synchronous motor driving system that is small, high-output, low-vibration, low-noise, and efficient.

6. Modifications and Other Notes (1) The structure in the above Embodiments has 10q poles and 9q teeth, but the present invention is not limited in this way, and combinations of other numbers of magnetic poles and teeth may be used. For example, structures with 8q poles and 9q teeth, with 10q poles and 12q teeth, or with 16q poles and 15q teeth (q being a positive integer) are possible. Note that the ratio of first coils and second coils wound around each stator yoke section is set so as to cancel the phase difference with respect to the reference stator tooth. By doing so, when the axes of the stator teeth and the points between the rotor magnetic poles coincide, the stator teeth-produced magnetic fields are at maximum magnitude, and so the magnetic torque produced by each of the stator teeth is also maximized, which in turn increases the total torque. Also, the torque produced by each of the stator teeth is nearly uniform, which reduces torque ripple.

(2) Note that the ratio of first coils and second coils wound around each stator yoke section is set so as to cancel the phase difference between adjacent stator teeth. By doing so, when the axes of the stator teeth and the points between the rotor magnetic poles coincide, the stator teeth-produced magnetic fields are at maximum magnitude, and so the magnetic torque produced by each of the stator teeth is also maximized, which in turn increases the total torque. Also, the torque produced by each of the stator teeth is nearly uniform, which reduces torque ripple.

(3) The Embodiments describe an example of a three-phase driven synchronous motor, but the present invention may also be adapted to an equivalent synchronous motor that is driven in multiple phases, such as five phases or seven phases.

(4) In the Embodiments, the stator coils are wound around the stator yoke section, but these stator coils may be combined with coils wound around the stator teeth.

(5) Although not particularly mentioned in the description of the embodiments, a skew structure may be adopted for the stator coils. With a skew structure, the stator teeth are circumferentially skewed progressively along the axis direction of the rotor by, at most, the interval between two adjacent stator coils.

(6) The embodiments above exemplify an outer rotor type synchronous motor in which the rotor is disposed outside the stator. However, the same effect can be achieved by an inner rotor type synchronous motor in which the rotor is disposed inside the stator, a so-called axial gap type synchronous motor in which the rotor and the stator are disposed with a space therebetween in the axial direction, and a synchronous motor with a combination of these structures.

(7) In the embodiments above, the magnetic poles of the rotor are composed of permanent magnets. However, the present invention is applicable to synchronous motors using reluctance torque generated from a difference in magnetoresistance, and synchronous motors which include a combination of permanent magnets and reluctance torque in the rotor.

(8) The present invention is not limited to synchronous rotational machines, but may also be applied to synchronous generators, and to a directly driven linear synchronous motor or linear synchronous generator.

(9) The present invention provides a synchronous motor that is small, high-output, low-vibration, low-noise, and efficient. This synchronous motor is particularly useful for automobiles, for which low-vibration and low-noise motors are in demand. Furthermore, since this synchronous motor is slim while having a large diameter, it is particularly useful as an in-wheel motor.

(10) The above Embodiments and Modifications may be combined with one another. For example, the coils shown in FIG. 7 and described in Embodiment 3 may be used as the coils for the stator 23 shown in FIG. 5 and described in Embodiment 2.

INDUSTRIAL APPLICABILITY

The present invention may be used as a synchronous motor in compressors, electric cars, hybrid cars, fuel cell-powered cars, and the like, in which there is a desire for a small, efficient, low-vibration, and low-noise motor.

REFERENCE SIGNS LIST 1 synchronous motor
2 rotor
3 stator
4 rotor core
5 permanent magnet
7 stator teeth
8a, 8b, 8c, 8a', 8b', 8c' stator teeth group
10, 11, 11' point between magnetic poles

The invention claimed is:

1. A synchronous motor comprising:
a rotor having a plurality of magnetic poles arranged around a circumference of the rotor at an equal interval; and
a stator having a plurality of stator teeth arranged around a circumference of the stator, the stator teeth radially protruding from an annular yoke of the stator and differing in number from the magnetic poles, wherein
the stator teeth form a plurality of stator teeth groups, each of the stator teeth groups including a predetermined number of stator teeth consecutive around the circumference of the stator, and the stator teeth groups being arranged circumferentially at an equal interval,
the predetermined number of stator teeth are arranged at an interval different from the interval of the magnetic poles of the rotor,
for each stator tooth among the predetermined number of stator teeth, a main coil included in a coil of one phase is wound around at least one of two sections of the yoke respectively located between the stator tooth and a stator tooth adjacent on either side,
in at least one of the predetermined number of stator teeth in a certain stator teeth group, in addition to the main coil, a sub-coil included in a coil of a different phase than the one phase is wound around the at least one of two sections of the yoke,
the sub-coil is connected in series with the main coil included in another stator teeth group located at a different electrical angle than the certain stator teeth group,
the number of turns in each coil and a direction in which each coil is wound are set to compensate for a difference between a timing at which a magnetic field produced at each stator tooth by applying alternating current to each coil is at a maximum value and a timing at which a point between adjacent magnetic poles passes by the stator tooth as the rotor rotates,
in each stator teeth group, only the main coil is wound in correspondence with a first stator tooth among the predetermined number of stator teeth, and the main coil and the sub-coil are wound in correspondence with a second stator tooth adjacent to the first stator tooth, and
a coil ratio between the main coil and the sub-coil wound in correspondence with the second stator tooth is set so that when the first stator tooth and the magnetic poles of the rotor are in a predetermined positional relationship, the magnetic field produced at the first stator tooth is at the maximum value, and when the rotor rotates so that the second stator tooth and the magnetic poles of the rotor are in the same positional relationship as the predetermined positional relationship, the magnetic field produced at the second stator tooth is at the maximum value.

2. The synchronous motor of claim 1, wherein
the other stator teeth group located at the different electrical angle than the certain stator teeth group is adjacent to the certain stator teeth group.

3. The synchronous motor of claim 1, wherein
for each of the stator teeth groups, a sub-coil is wound in correspondence with each of at least two of the predetermined number of stator teeth, and
the coil of one phase includes, by connection in series, every main coil corresponding to the stator teeth included in a certain stator teeth group, the sub-coil corresponding to one of the stator teeth included in one of the stator teeth groups located ahead of the certain stator teeth group in electrical angle, and the sub-coil corresponding to one of the stator teeth included in one of the stator teeth groups located behind the certain stator teeth group in electrical angle.

4. The synchronous motor of claim 1, wherein
in each stator teeth group, the number of turns in the main coil wound in correspondence with the first stator tooth, and the number of turns in the main coil and the number of turns in the sub-coil wound in correspondence with the second stator tooth, are set so that the maximum value of the magnetic field produced at the first stator tooth and the maximum value of the magnetic field produced at the second stator tooth are equal.

5. The synchronous motor of claim 1, wherein
a coil coefficient $\alpha$ is defined such that when the number of the magnetic poles is A, A being an even integer two or greater, the number of stator teeth is B, B being a multiple of three not equal to A, the number of magnetic pole pairs P is A/2, m is a positive integer, and k is the number of stator teeth per phase equaling B/3, then when $k=3m$, $\alpha=|2\pi/A-2\pi/B|\times P$, and when $k=3m+1$, or when $k=3m+2$, $\alpha=|2\pi/A-2\pi/B|\times P/2$, and
when six coils of the same phase are respectively wound around six adjacent sections of the yoke and are connected in series, ratios of numbers of turns of each coil being, in order, +N1, −N2, +N3, −N3, +N2, and −N1, +Nn being the same number of turns as −Nn yet wound in an opposite direction, n being 1, 2, or 3,
N1 is approximately equal to $\sin(\alpha)$,
N2 is approximately equal to $\sin(\alpha)+\sin(\pi/3-\alpha)$, and
N3 is approximately equal to $\sin(\pi/3)+\sin(\pi/3-\alpha)$.

6. The synchronous motor of claim 1, wherein
the rotor rotates around the stator with the stator at a center of rotation,
the stator teeth radially protrude outward from a peripheral surface of the stator yoke,
a plurality of inner stator teeth, equal in number to the outer stator teeth, are further provided protruding inwards from an inner peripheral surface of the stator yoke in a direction opposite the stator teeth that protrude outward, and
the synchronous motor further comprises a rotor rotating along an inner periphery of the stator.

7. The synchronous motor of claim 1, wherein
at least one of the stator teeth is in a skew arrangement by being circumferentially skewed progressively along an axis direction of the rotor by, at most, the interval between the stator teeth.

8. The synchronous motor of claim 1, wherein
the synchronous motor is an Interior Permanent Magnet Motor.

9. The synchronous motor of claim 1, wherein
the sections of the yoke include first sections, around each of which a coil of one of three phases is wound by concentrated winding, and second sections, around each of which coils of two of three phases are wound by concentrated winding, and
a phase of one coil among the coils wound around one of the second sections adjacent to one of the first sections is the same phase as the coil wound around the one of the first sections.

10. The synchronous motor of claim 9, wherein
a coil coefficient a is defined such that when the number of the magnetic poles is A, the number of stator teeth is B, the number of magnetic pole pairs P is A/2, m is a positive integer, and k is the number of stator teeth per phase equaling B/3, then when $k=3m$, $\alpha=|2\pi/A-2\pi/B|\times P$, when $k=3m+1$, or when $k=3m+2$, $\alpha=|2\pi/A-2\pi/B|\times P/2$, and
when a coil of one of three phases or coils of two of three phases are wound around each section of the yoke by concentrated winding, and the number of turns of the coil wound around each first section is N1, then among the coils wound around one of the first sections and one of the second sections adjacent thereto, the number of turns of a coil of a first phase is approximately equal to $(N1)\times\sin(\alpha)/\sin(\pi/3)$, and the number of turns of a coil of a second phase is approximately equal to $(N1)\times\sin(\pi/3-\alpha)/\sin(\pi/3)$.

11. The synchronous motor of claim 9, wherein
the number of turns in the coil in each first section equals a sum of the number of turns in the coils in one of the second sections.

12. The synchronous motor of claim 1, wherein
a coil coefficient a is defined such that when the number of the magnetic poles is A, the number of stator teeth is B, the number of magnetic pole pairs P is A/2, m is a positive integer, and k is the number of stator teeth per phase equaling B/3, then when $k=3m$, $\alpha=|2\pi/A-2\pi/B|\times P$, when $k=3m+1$, or when $k=3m+2$, $\alpha=|2\pi/A-2\pi/B|\times P/2$, and
when a coil of a first phase and a coil of a second phase, the first and the second phase being any two of three phases, are wound around a section of the yoke by concentrated winding, a ratio of number of turns of the coil of the first phase to the number of turns of the coil of the second phase is approximately equal to a ratio of $\sin(\alpha)/\sin(\pi/3)$ to $\sin(\pi/3-\alpha)/\sin(\pi/3)$.

13. The synchronous motor of claim 1, wherein
the sub-coil has fewer turns than the main coil.

14. A synchronous motor driving system formed by a synchronous motor and a corresponding actuator device, wherein
the synchronous motor comprises:
a rotor having a plurality of magnetic poles arranged around a circumference of the rotor at an equal interval; and
a stator having a plurality of stator teeth arranged around a circumference of the stator, the stator teeth radially protruding from an annular yoke of the stator and differing in number from the magnetic poles, wherein the stator teeth form a plurality of stator teeth groups, each of the stator teeth groups including a predetermined number of stator teeth consecutive around the circumference of the stator, and the stator teeth groups being arranged circumferentially at an equal interval, the predetermined number of stator teeth are arranged at an interval different from the interval of the magnetic poles of the rotor, for each stator tooth among the predetermined number of stator teeth, a main coil included in a coil of one phase is wound around at least one of two sections of the yoke respectively located between the stator tooth and a stator tooth adjacent on either side, in at least one of the predetermined number of stator teeth in a certain stator teeth group, in addition to the main coil, a sub-coil included in a coil of a different phase than the one phase is wound around the at least one of two sections of the yoke, the sub-coil is connected in series with the main coil included in another stator teeth group located at a different electrical angle than the certain stator teeth group, the number of turns in each coil and a direction in which each coil is wound are set to compensate for a difference between a timing at which a magnetic field produced at each stator tooth by applying alternating current to each coil is at a maximum value and a timing at which a point between adjacent magnetic poles passes by the stator tooth as the rotor rotates, in each stator teeth group, only the main coil is wound in correspondence with a first stator tooth among the predetermined number of stator teeth, and the main coil and the sub-coil are wound in correspondence with a second stator tooth adjacent to the first stator tooth, and a coil ratio between the main coil and the sub-coil wound in correspondence with the second stator tooth is set so that when the first stator tooth and the magnetic poles of the rotor are in a predetermined positional relationship, the magnetic field produced at the first stator tooth is at the maximum value, and when the rotor rotates so that the second stator tooth and the magnetic poles of the rotor are in the same positional relationship as the predetermined positional relationship, the magnetic field produced at the second stator tooth is at the maximum value.

15. The synchronous motor driving system of claim 14, wherein
the other stator teeth group located at the different electrical angle than the certain stator teeth group is adjacent to the certain stator teeth group.

16. The synchronous motor driving system of claim 14, wherein
for each of the stator teeth groups, a sub-coil is wound in correspondence with each of at least two of the predetermined number of stator teeth, and
the coil of one phase includes, by connection in series, every main coil corresponding to the stator teeth included in a certain stator teeth group, the sub-coil corresponding to one of the stator teeth included in one of the stator teeth groups located ahead of the certain stator teeth group in electrical angle, and the sub-coil corresponding to one of the stator teeth included in one of the stator teeth groups located behind the certain stator teeth group in electrical angle.

17. The synchronous motor driving system of claim 14, wherein
in each stator teeth group, the number of turns in the main coil wound in correspondence with the first stator tooth, and the number of turns in the main coil and the number of turns in the sub-coil wound in correspondence with the second stator tooth, are set so that the maximum value of the magnetic field produced at the first stator tooth and the maximum value of the magnetic field produced at the second stator tooth are equal.

18. The synchronous motor driving system of claim 14, wherein
a coil coefficient $\alpha$ is defined such that when the number of the magnetic poles is A, A being an even integer two or greater, the number of stator teeth is B, B being a multiple of three not equal to A, the number of magnetic pole pairs P is A/2, m is a positive integer, and k is the number of stator teeth per phase equaling B/3, then when $k=3m$, $\alpha=|2\pi/A-2\pi/B|\times P$, and when $k=3m+1$, or when $k=3m+2$, $\alpha=|2\pi/A-2\pi/B|\times P/2$, and when six coils of the same phase are respectively wound around six adjacent sections of the yoke and are connected in series, ratios of numbers of turns of each coil being, in order, +N1, −N2, +N3, −N3, +N2, and −N1, +Nn being the same number of turns as −Nn yet wound in an opposite direction, n being 1, 2, or 3, N1 is approximately equal to $\sin(\alpha)$,
N2 is approximately equal to $\sin(\alpha)+\sin(\pi/3-\alpha)$, and
N3 is approximately equal to $\sin(\pi/3)+\sin(\pi/3-\alpha)$.

19. The synchronous motor driving system of claim 14, wherein
at least one of the stator teeth is in a skew arrangement by being circumferentially skewed progressively along an axis direction of the rotor by, at most, the interval between the stator teeth.

20. The synchronous motor driving system of claim 14, wherein
the sub-coil has fewer turns than the main coil.

21. A synchronous motor comprising:
a rotor having a plurality of magnetic poles arranged around a circumference of the rotor at an equal interval; and
a stator having a plurality of stator teeth arranged around a circumference of the stator, the stator teeth radially protruding from an annular yoke of the stator and differing in number from the magnetic poles, wherein
the stator teeth form a plurality of stator teeth groups, each of the stator teeth groups including a predetermined number of stator teeth consecutive around the circumference of the stator, and the stator teeth groups being arranged circumferentially at an equal interval,
the predetermined number of stator teeth are arranged at an interval different from the interval of the magnetic poles of the rotor,
for each stator tooth among the predetermined number of stator teeth, a main coil included in a coil of one phase is wound around at least one of two sections of the yoke respectively located between the stator tooth and a stator tooth adjacent on either side,
in at least one of the predetermined number of stator teeth in a certain stator teeth group, in addition to the main coil, a sub-coil included in a coil of a different phase than the one phase is wound around the at least one of two sections of the yoke, the sub-coil is connected in series with the main coil included in another stator teeth group located at a different electrical angle than the certain stator teeth group, the number of turns in each coil and a direction in which each coil is wound are set to compensate for a difference between a timing at which a magnetic field produced at each stator tooth by applying alternating current to each coil is at a maximum value and a timing at which a point between adjacent magnetic poles passes by the stator tooth as the rotor rotates, wherein the sub-coil and the main coil are part of a plurality of stator coils which form stator coil groups, each stator coil group including m stator coils, wherein the m stator coils in each stator coil group are arranged at an equal interval differing from the interval between the magnetic poles of the rotor.

22. The synchronous motor of claim 21, wherein the m stator coils in each stator coil group are respectively connected to individual external terminals.

* * * * *